(12) United States Patent
Ikeda

(10) Patent No.: US 6,853,389 B1
(45) Date of Patent: Feb. 8, 2005

(54) INFORMATION SEARCHING APPARATUS, INFORMATION SEARCHING METHOD, AND STORAGE MEDIUM

(75) Inventor: Kazuyo Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/553,858

(22) Filed: Apr. 21, 2000

(30) Foreign Application Priority Data

| Apr. 26, 1999 | (JP) | .......................................... 11-117921 |
| Apr. 26, 1999 | (JP) | .......................................... 11-117922 |
| Apr. 26, 1999 | (JP) | .......................................... 11-117923 |
| Apr. 26, 1999 | (JP) | .......................................... 11-117927 |

(51) Int. Cl.[7] ............................ G09G 5/00; G09G 5/14; G09G 5/30
(52) U.S. Cl. ................... 345/790; 345/781; 345/705; 345/619; 345/716; 345/156; 707/3; 707/4; 707/5; 707/6
(58) Field of Search ............................... 345/156, 716, 345/619, 705, 781, 790; 707/3, 4, 5, 6

(56) References Cited

U.S. PATENT DOCUMENTS

| 6,181,838 B1 | * | 1/2001 | Knowlton | .................... 382/305 |
| 6,339,767 B1 | * | 1/2002 | Rivette et al. | .................. 707/1 |
| 6,463,431 B1 | * | 10/2002 | Schmitt | ......................... 707/5 |

FOREIGN PATENT DOCUMENTS

JP 8-339375 12/1996

* cited by examiner

Primary Examiner—Jeffery Brier
Assistant Examiner—David Amini
(74) Attorney, Agent, or Firm—Fitzpatrick, Cella, Harper & Scinto

(57) ABSTRACT

An information searching apparatus for searching for information calculates a matching degree, which indicates a degree at which searching conditions used for searching for the information are satisfied, decides a complete matching area in which is displayed information whose matching degree indicates a complete matching, and displays information on an inside or an outside of the complete matching area in accordance with whether or not the matching degree of the information indicates a complete matching.

51 Claims, 26 Drawing Sheets

FIG. 10

| IMAGE ID | IMAGE FILE | EXPLANATION |
|---|---|---|
| 0 | 0000000.jpg | a red apple |
| ⋮ | ⋮ | ⋮ |
| 100 | 0000100.jpg | a red strawberry on the ⋯ |
| ⋮ | ⋮ | ⋮ |
| 200 | 0000200.jpg | a green apple in the big ⋯ |
| ⋮ | ⋮ | ⋮ |
| 300 | 0000300.jpg | a red apple and a yellow ⋯ |
| ⋮ | ⋮ | ⋮ |

FIG. 11

| 0 | 1 | 2 | 3 | ⋯ |
|---|---|---|---|---|
| 30 | 60 | 90 | 120 | ⋯ |

FIG. 12

| IMAGE NUMBER | 1 | 2 | | 3 | | | |
|---|---|---|---|---|---|---|---|
| x COORDINATE | 0 | 0 | 0 | 0 | 45 | −45 | ⋯ |
| y COORDINATE | 0 | 35 | −35 | 35 | −35 | −35 | ⋯ |

FIG. 13

| NUMBER | 0 | 4 | 10 | ⋯ |
|---|---|---|---|---|
| RADIUS INCREMENT | 30 | 60 | 90 | ⋯ |

FIG. 14

| 1 | 2 | 3 | 4 | 5 | 6 | 7 | ⋯ |
|---|---|---|---|---|---|---|---|
| 90 | 180 | 270 | 0 | 135 | 225 | 315 | ⋯ |

FIG. 15

| IMAGE ID | SIMILARITY |
|---|---|
| 0 | 1.000 |
| 456 | 1.000 |
| 789 | 1.000 |
| 123 | 0.952 |
| 876 | 0.928 |
| 765 | 0.922 |
| 567 | 0.904 |
| 234 | 0.901 |
| 345 | 0.892 |
| ⋮ | ⋮ |
| 321 | 0.808 |
| 210 | 0.765 |
| ⋮ | ⋮ |

IMAGE ID

| 0 | SIMILAR IMAGE LIST |
| 1 | SIMILAR IMAGE LIST |
| 2 | SIMILAR IMAGE LIST |
| 3 | SIMILAR IMAGE LIST |
| ⋮ | |

| IMAGE ID | REPRESENTATIVE IMAGE ID | SIMILARITY |
|---|---|---|
| ⋮ | ⋮ | ⋮ |
| 567 | 765 | 0.954 |
| 851 | 765 | 0.912 |
| ⋮ | ⋮ | ⋮ |
| 345 | 876 | 0.928 |
| ⋮ | ⋮ | ⋮ |

FIG. 19

| (T201) SCREEN NUMBER | START AREA | SCALE WIDTH | | | | | | | |
|---|---|---|---|---|---|---|---|---|---|
| | | 1.0 | 0.9 | 0.8 | 0.7 | 0.6 | 0.5 | 0.4 | ... |
| 0 | 0 | 120 | 90 | 90 | −1 | −1 | −1 | −1 | ... |
| 1 | 3 | 30 | 30 | 30 | 90 | 30 | 90 | −1 | ... |
| ⋮ | ⋮ | ⋮ | ⋮ | ⋮ | ⋮ | ⋮ | ⋮ | ⋮ | ⋮ |

FIG. 20

| (T202) SCREEN NUMBER | START AREA | SCALE WIDTH | | | | | | | |
|---|---|---|---|---|---|---|---|---|---|
| | | 1.0 | 0.9 | 0.8 | 0.7 | 0.6 | 0.5 | 0.4 | ... |
| 0 | 0 | 60 | 60 | 60 | 60 | 60 | −1 | −1 | ... |
| ⋮ | ⋮ | ⋮ | ⋮ | ⋮ | ⋮ | ⋮ | ⋮ | ⋮ | ⋮ |

INFORMATION SEARCHING APPARATUS, INFORMATION SEARCHING METHOD, AND STORAGE MEDIUM

BACKGROUND OF THE INVENTION

1. Field of the Invention

The invention relates to an information searching apparatus, an information searching method, and a storage medium. More particularly, the invention relates to an information searching apparatus, an information searching method, and a storage medium which are suitable in case of searching and displaying information in a computer or the like.

2. Related Background Art

Hitherto, a method of searching information and displaying a search result exists. In a conventional technique, for example, also as shown in Japanese Patent Application Laid-Open No. 8-339375, a method whereby information as a search result is displayed in a two-dimensional or three-dimensional space and the search result having a higher matching degree is displayed at a position closer to an origin of the space, thereby enabling the matching degree of the search result to be visually seen and displaying the search result has been used.

However, if the above conventional method is merely used, in the case where a plurality of information whose matching degrees indicate the complete matching exists, those information is overlappingly displayed, so that there is such a problem that all of the information which the user wants to see the result most cannot be seen. Even if the matching degree does not indicate the complete matching, the information having high matching degrees are easily overlapped, so that there is such a problem that it is more difficult to see the information having the higher matching degree. It is also difficult to distinguish the information which is completely matched from the information which is not completely matched.

Hitherto, since the display position of the search result is determined only from a viewpoint of the matching degree, in order to know whether desired information exists in the search result or not, it is necessary to check the individual information of all of the search results, so that there is such a problem that an evaluating efficiency of the search result is low.

The invention is made in consideration of the above problems and it is an object of the invention to provide an information searching apparatus, an information searching method, and a storage medium, for enabling information which the user wants to see most as a search result to be easily seen.

The invention is made in consideration of the above problems and it is an object of the invention to provide an information searching apparatus, an information searching method, and a storage medium, for enabling all information of search results which the user wants to see most to be seen without being hidden behind other information.

The invention is made in consideration of the above problems and it is an object of the invention to provide an information searching apparatus, an information searching method, and a storage medium which can avoid such a situation that information having high matching degrees are mutually overlapped and become difficult to be seen.

The invention is made in consideration of the above problems and it is an object of the invention to provide an information searching apparatus, an information searching method, and a storage medium for enabling the user to know at a glance whether information is completely matched or not.

The invention is made in consideration of the above problems and it is an object of the invention to provide information searching method and apparatus in which the user can know whether desired information exists in a search result or not without checking each information of all of the search results, and an evaluating efficiency of the search result can be improved.

According to the conventional method, however, although the distance from the origin to the information displaying position is determined on the basis of the matching degree, for example, since an element to decide the position other than the distance, namely, an element such as an angle for a reference direction from the center is determined at random, if the user wants to see the search results in order from the result having a higher matching degree, there is such a drawback that the user cannot decide which information he should see first.

Since the element to decide the position other than the distance is determined at random, there is such a possibility that a plurality of information having near matching degrees is mutually overlapped and displayed, so that they are difficult to be seen.

The invention is made in consideration of the above problems and it is an object of the invention to provide an information searching apparatus, an information searching method, and a storage medium, in which the user can see information in order from a higher matching degree on a screen to display search results, and a plurality of information having near matching degrees can be displayed while avoiding such a situation that they are mutually overlapped.

SUMMARY OF THE INVENTION

According to a preferred embodiment of the invention, there is provided an information searching apparatus for searching information, comprising: matching degree calculating means for calculating a matching degree as a degree which satisfies searching conditions of information; complete matching area deciding means for deciding a display area of information whose matching degree indicates a complete matching; and search result display control means for displaying the information on the inside or outside of the complete matching area in accordance with whether the matching degree indicates the complete matching or not.

BRIEF DESCRIPTION OF THE DRAWINGS

FIG. 10 is an explanatory diagram showing a construction of an image database read into the RAM of the information searching apparatus according to the embodiment of the invention;

FIG. 11 is an explanatory diagram showing a construction of matching area data read into the RAM of the information searching apparatus according to the embodiment of the invention;

FIG. 12 is an explanatory diagram showing a construction of matching image data read into the RAM of the information searching apparatus according to the embodiment of the invention;

FIG. 13 is an explanatory diagram showing a construction of radius increment data read into the RAM of the information searching apparatus according to the embodiment of the invention;

FIG. 14 is an explanatory diagram showing a construction of allocation angle data held in the RAM of the information searching apparatus according to the embodiment of the invention;

FIG. 15 is an explanatory diagram showing a construction of a similar image buffer held in the RAM of the information searching apparatus according to the embodiment of the invention;

FIG. 19 is an explanatory diagram showing a construction of screen information held in the RAM of the information searching apparatus according to the embodiment of the invention;

FIG. 20 is an explanatory diagram showing a construction of screen information held in the RAM of the information searching apparatus according to the embodiment of the invention;

DETAILED DESCRIPTION OF THE PREFERRED EMBODIMENTS

An embodiment of the invention will now be described hereinbelow with reference to the drawings.

Figure 1:
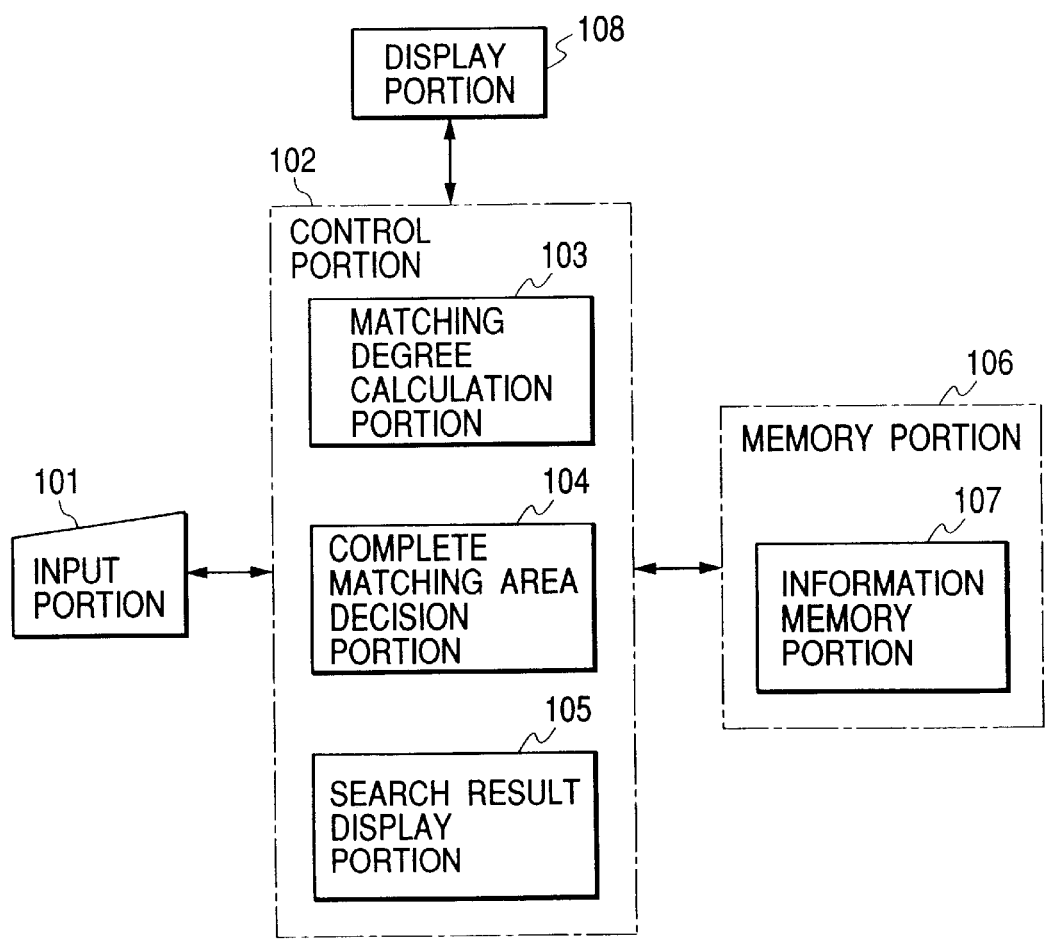
FIG. 1 is a functional block diagram showing a concept of an information searching apparatus according to an embodiment of the invention.

FIG. 1 is a functional block diagram showing a concept of an information searching apparatus according to the embodiment of the invention. The information searching apparatus according to the embodiment of the invention comprises: an input portion 101; a control portion 102 having a matching degree calculation portion 103, a complete matching area decision portion 104, and a search result display portion 105; a memory portion 106 having an information memory portion 107; and a display portion 108.

A function of each portion will now be described in detail. The input portion 101 is constructed by a keyboard having character keys, function keys, and the like, or the like and inputs searching conditions to the control portion 102. The control portion 102 is constructed by a microprocessor, compares each information as a search target stored in the information memory portion 107 of the memory portion 106 with the searching conditions and controls each portion as follows. In the matching degree calculation portion 103, a matching degree of each information and the query is calculated in accordance with the significance of each query. In the complete matching area decision portion 104, an area to display the information which satisfies all of the searching conditions is decided as a complete matching area. In the search result display portion 105, the information which satisfies all of the searching conditions is obtained in the complete matching area, the display position of the information which satisfies a part of the searching conditions is obtained in an area other than the complete matching area from the matching degree, and such information is outputted to the display portion 108 and displayed. Each information as a search target has been stored in the information memory portion 107 of the memory portion 106. The display portion 108 displays the information on the basis of the control of the control portion 102.

Figure 2:
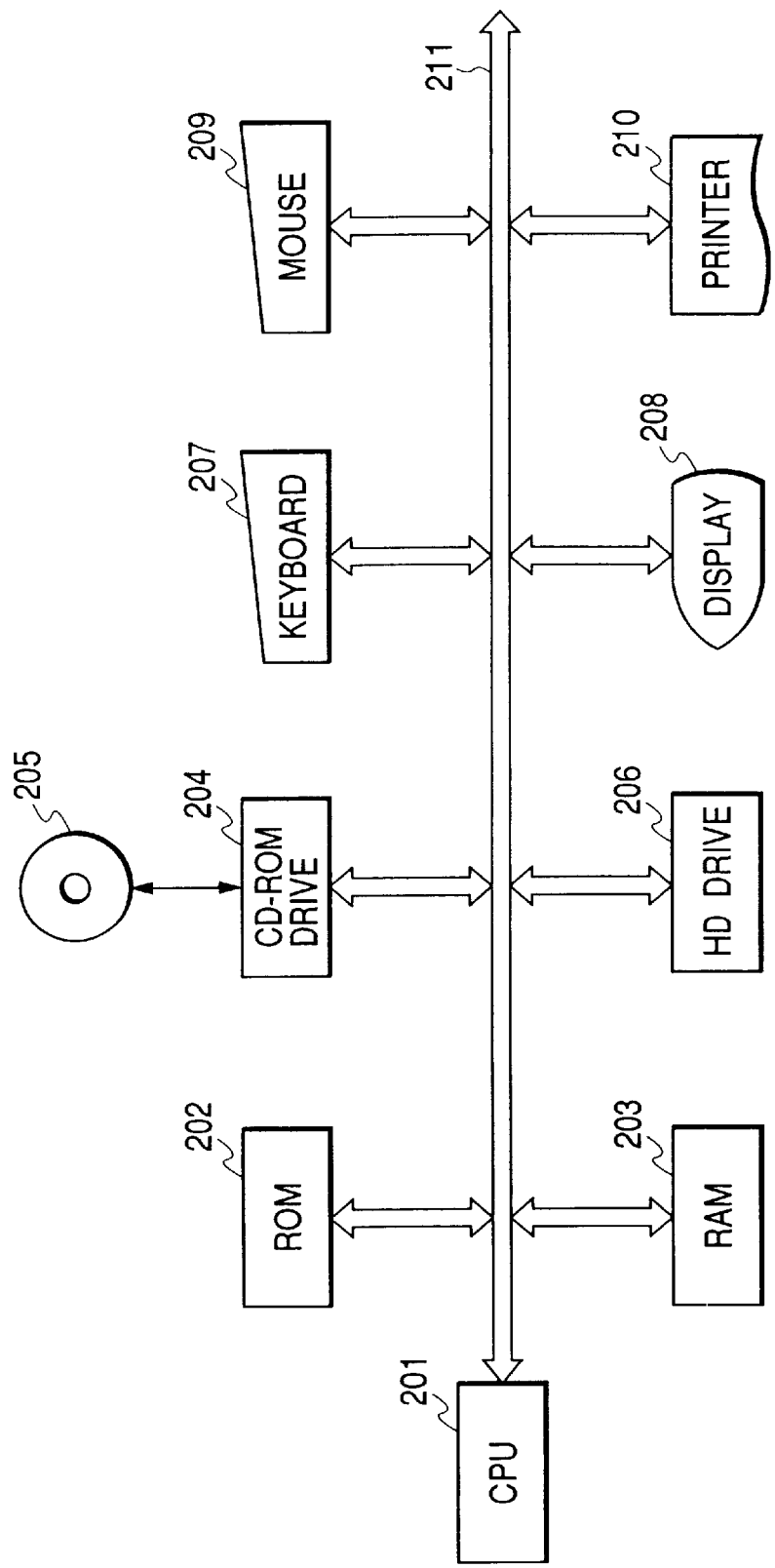
FIG. 2 is a block diagram showing a system construction of the information searching apparatus according to the embodiment of the invention.

FIG. 2 is a block diagram showing a system construction of the information searching apparatus according to the embodiment of the invention. The information searching apparatus according to the embodiment of the invention comprises: a CPU 201; an ROM 202; an RAM 203; a CD-ROM drive 204; a CD-ROM 205; an HD (hard disk) drive 206; a keyboard 207; a display 208; a mouse 209; a printer 210; and a control bus 211. FIG. 2 shows an example of the construction and the invention is not limited to the construction shown in the diagram.

Figure 4:
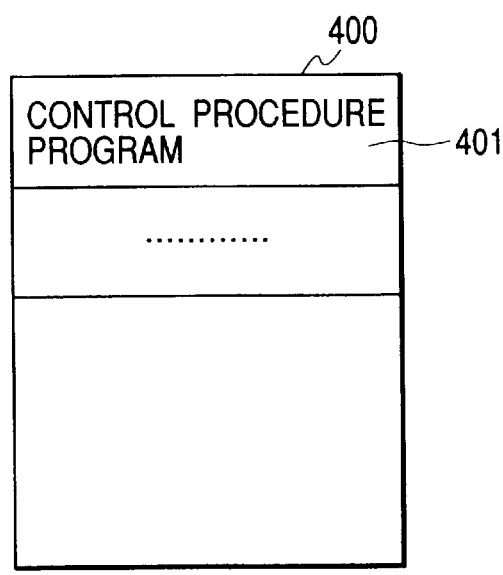
FIG. 4 is an explanatory diagram showing a construction of an ROM of the information searching apparatus according to the embodiment of the invention.
Figure 6:
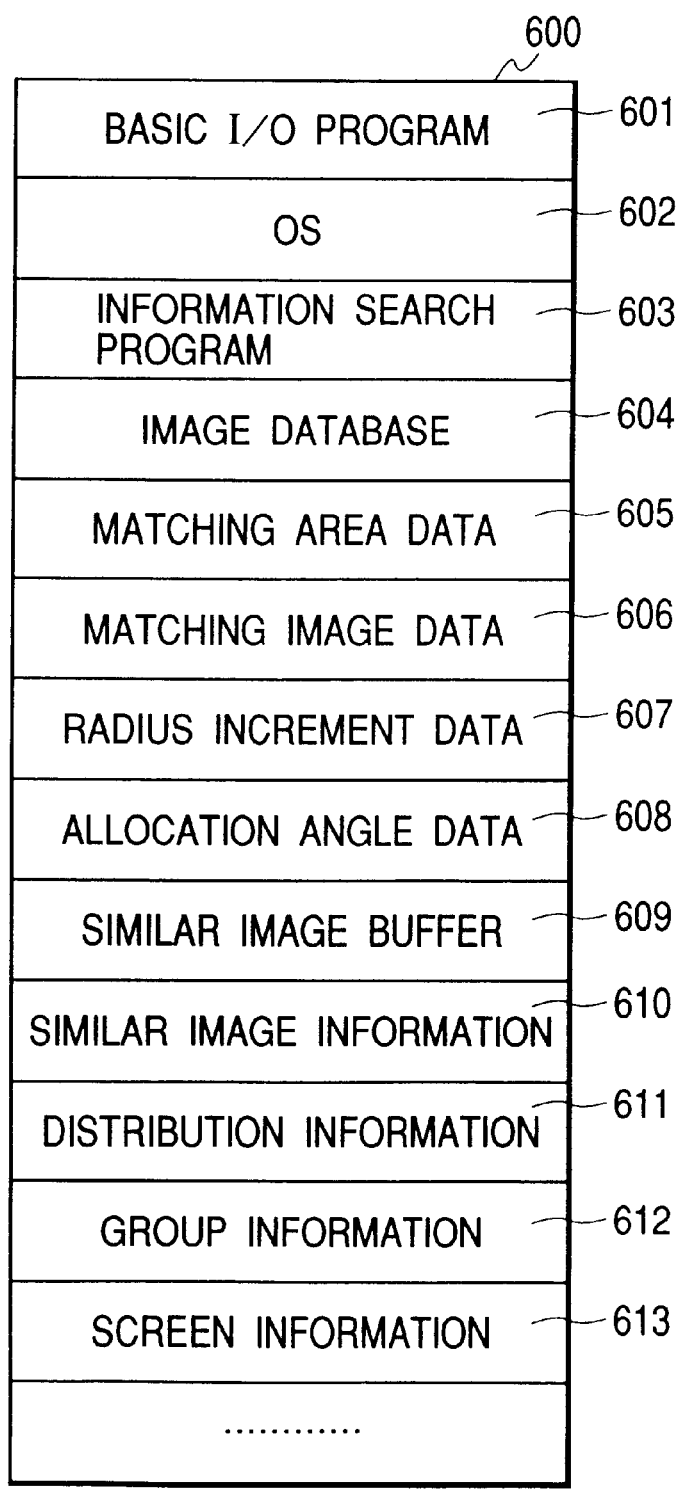
FIG. 6 is an explanatory diagram showing a structure of a memory map in a state where an information search program or the like stored in the CD-ROM of the information searching apparatus according to the embodiment of the invention has been loaded-into an RAM and can be executed.

The construction of each portion will now be described in detail. The CPU 201 is a central processing unit and executes processes shown in flowcharts of FIGS. 21 and 36, which will be explained hereinlater. The ROM 202 is a read only memory in which a control procedure program 401 has been stored as shown in FIG. 4, which will be explained hereinlater. The RAM 203 is a random read/write memory in which an information search program 603, an image database 604, matching area data 605, matching image data 606, radius increment data 607, allocation angle data 608, a similar image buffer 609, similar image information 610, distribution information 611, group information 612, screen information 613, and the like have been stored as shown in FIG. 6, which will be explained hereinlater.

The CD-ROM drive 204 controls the operation for reading out the information search program or the like from the CD-ROM 205. The CD-ROM 205 stores the information search program or the like. The HD drive 206 controls the operations for writing/reading data to/from the HD. The keyboard 207 has character keys, function keys, and the like and is used for various inputs. The display 208 displays various data on the basis of the control of the CPU 201. The mouse 209 is used to input a coordinate position on the display 208. The printer 210 performs the printing onto a recording medium. The control bus 211 is a common signal path to which each of the above portions is connected.

Figure 3:
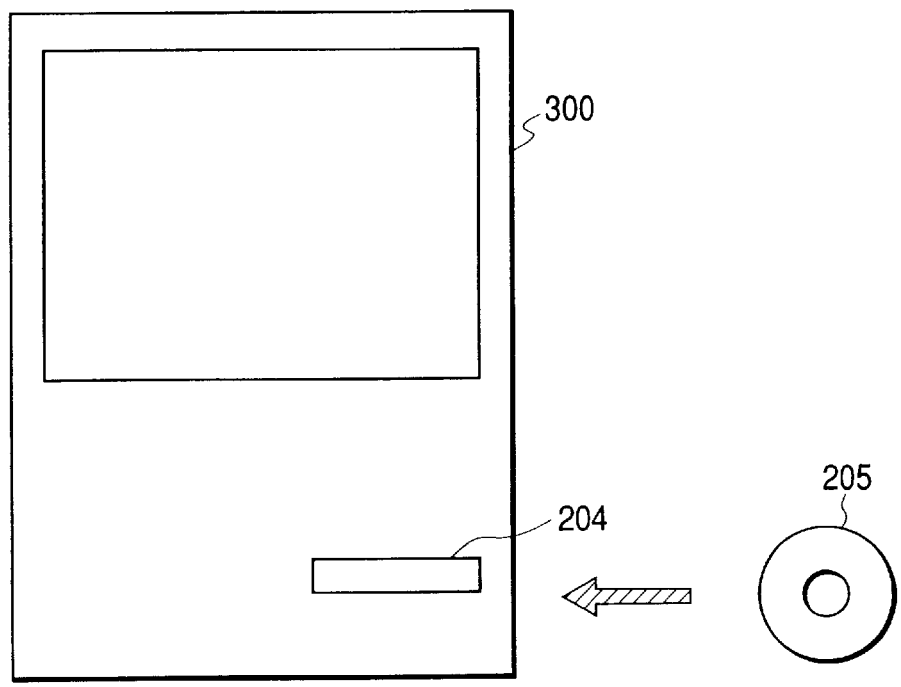
FIG. 3 is an explanatory diagram showing a concept in which a program or the like is supplied from a CD-ROM serving as a storage medium of the information searching apparatus according to the embodiment of the invention to a computer system (information searching apparatus)

FIG. 3 is a conceptual diagram showing a state where a program or the like is supplied from the CD-ROM 205 serving as a storage medium of the information searching apparatus according to the embodiment of the invention to a computer system (information searching apparatus). The information search program or the like is supplied by inserting the CD-ROM 205 into the CD-ROM drive 204 of a computer system 300. After that, the information search program or the like can be loaded from the CD-ROM 205 into the RAM 203 and executed, or the information search program or the like is stored temporarily from the CD-ROM 205 into the HD of the HD drive 206 and can be loaded from the HD into the RAM 203 and executed at a point when the information search program is made operative.

FIG. 4 is a conceptual diagram showing a construction of the ROM 202 of the information searching apparatus according to the embodiment of the invention. The control procedure program 401 and the like have been stored in a storage area 400 in the ROM 202 of the information searching apparatus according to the embodiment of the invention.

Figure 5:
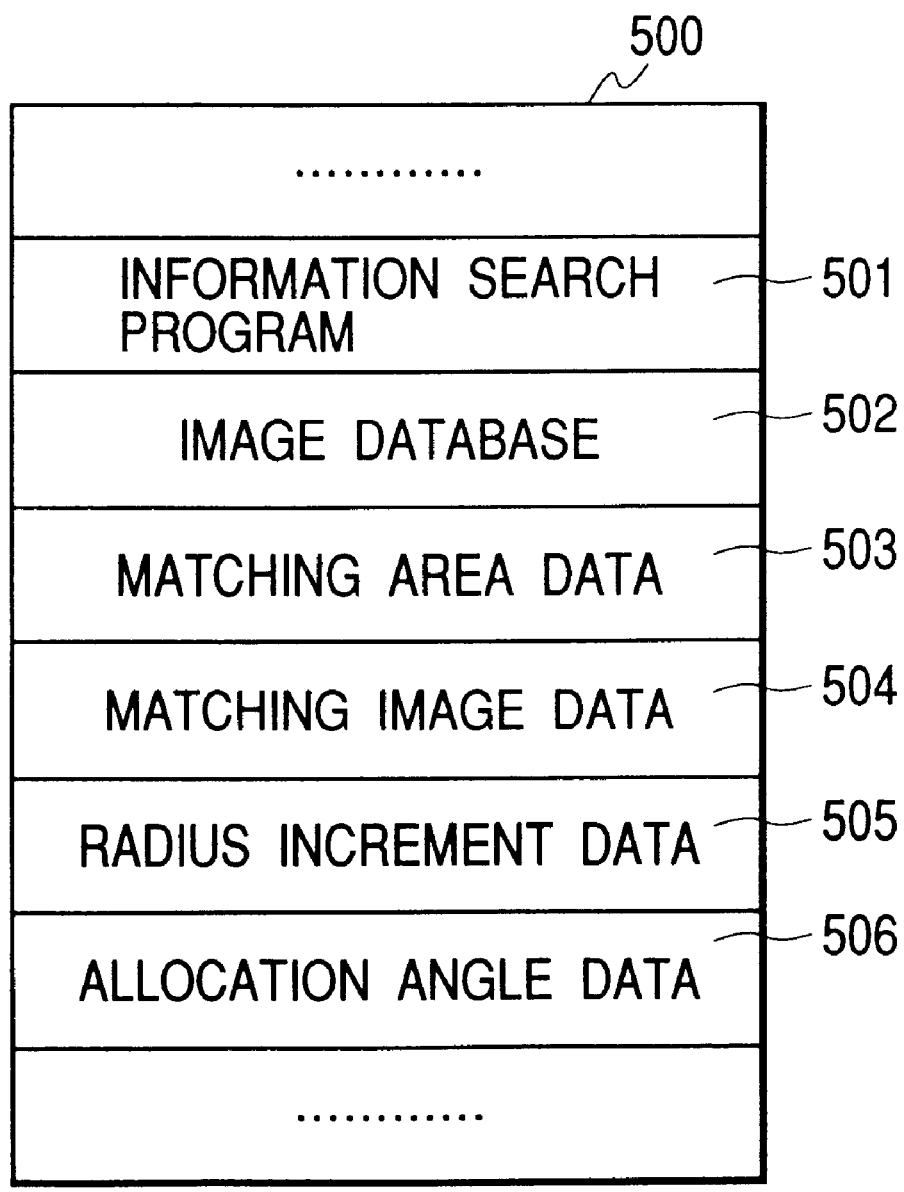
FIG. 5 is an explanatory diagram showing a construction of the CD-ROM of the information searching apparatus according to the embodiment of the invention.

FIG. 5 is a conceptual diagram showing a construction of the CD-ROM 205 serving as a storage medium of the information searching apparatus according to the embodiment of the invention. An information search program 501, an image database 502 as associated data, matching area data 503, matching image data 504, radius increment data 505, allocation angle data 506, and the like have been stored in a storage area 500 in the CD-ROM 205 of the information searching apparatus according to the embodiment of the invention.

FIG. 6 is a conceptual diagram showing a memory map 600 in a state where the information search program 501 stored in the CD-ROM 205 of the information searching apparatus according to the embodiment of the invention and the image database 502, matching area data 503, matching image data 504, radius increment data 505, allocation angle data 506, and the like which are the associated data have been loaded into the RAM 203 and can be executed. In the executable state, besides an information search program 603, an image database 604, matching area data 605, matching image data 606, radius increment data 607, and allocation angle data 608, areas for a similar image buffer 609, similar image information 610, distribution information 611, group information 612, and screen information 613 are held as memories which are used by the information search program and initialized.

Figure 7:
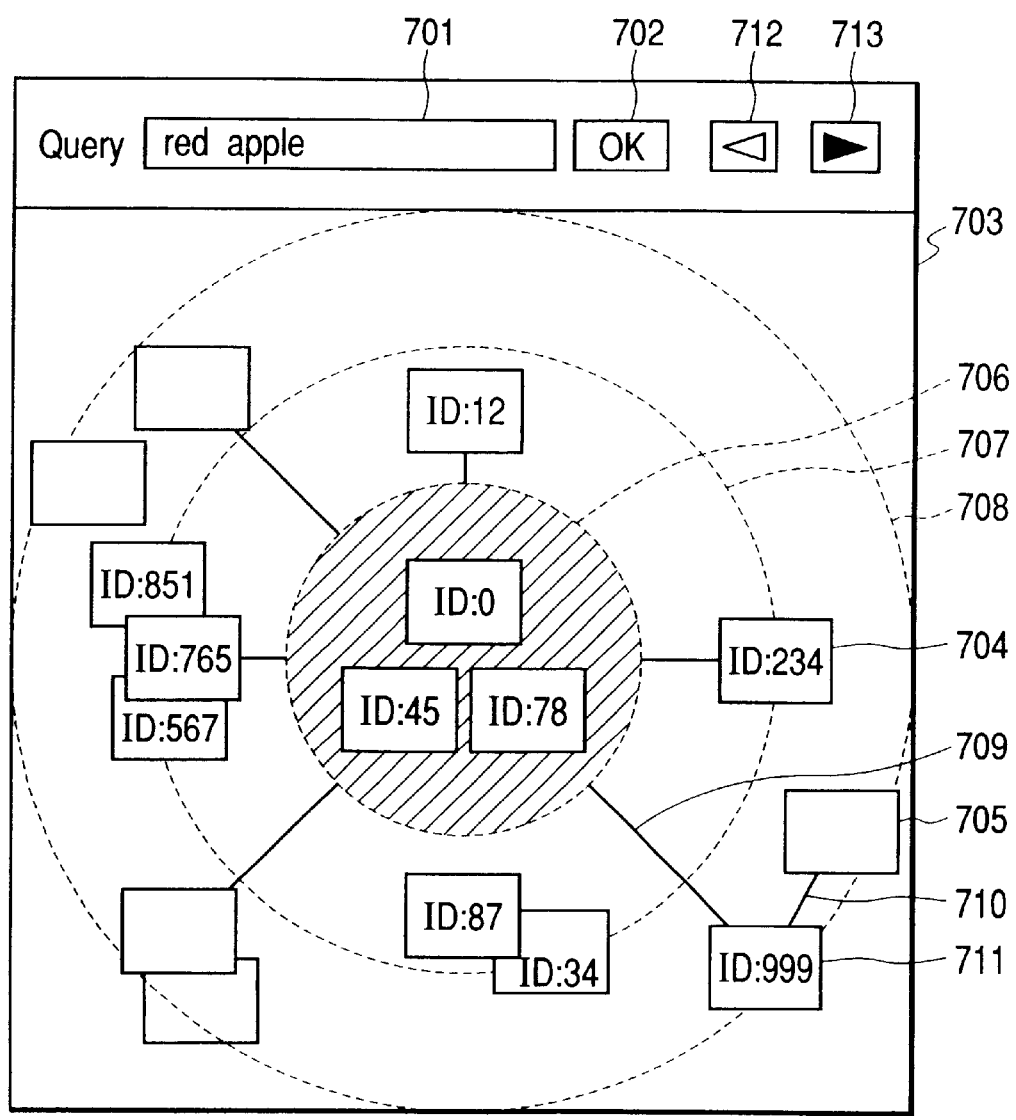
FIG. 7 is an explanatory diagram showing an example of a screen configuration of the first search result in the case where a query search is performed by the information searching apparatus according to the embodiment of the invention.
Figure 8:
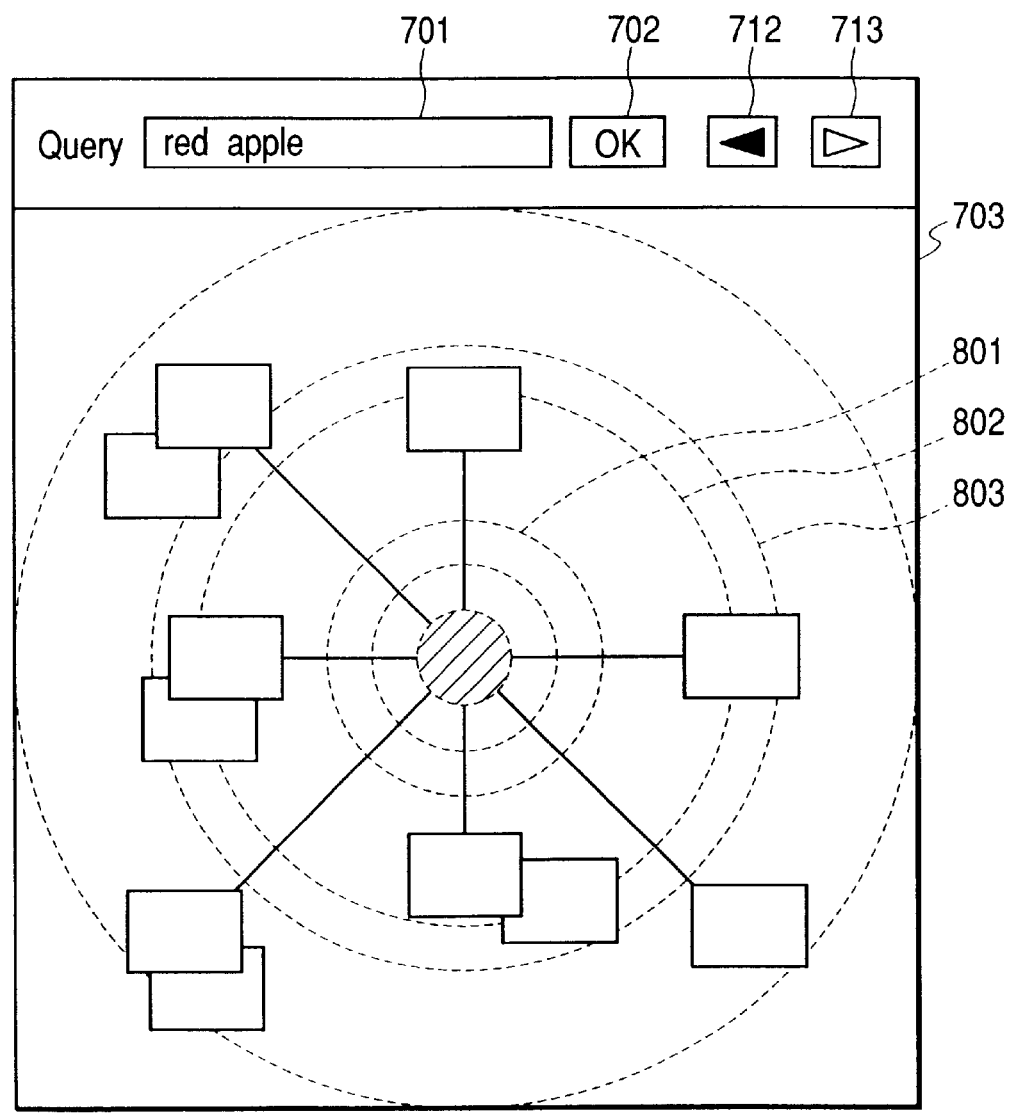
FIG. 8 is an explanatory diagram showing the next screen configuration example of the search result in the case where the query search is performed by the information searching apparatus according to the embodiment of the invention.
Figure 9:
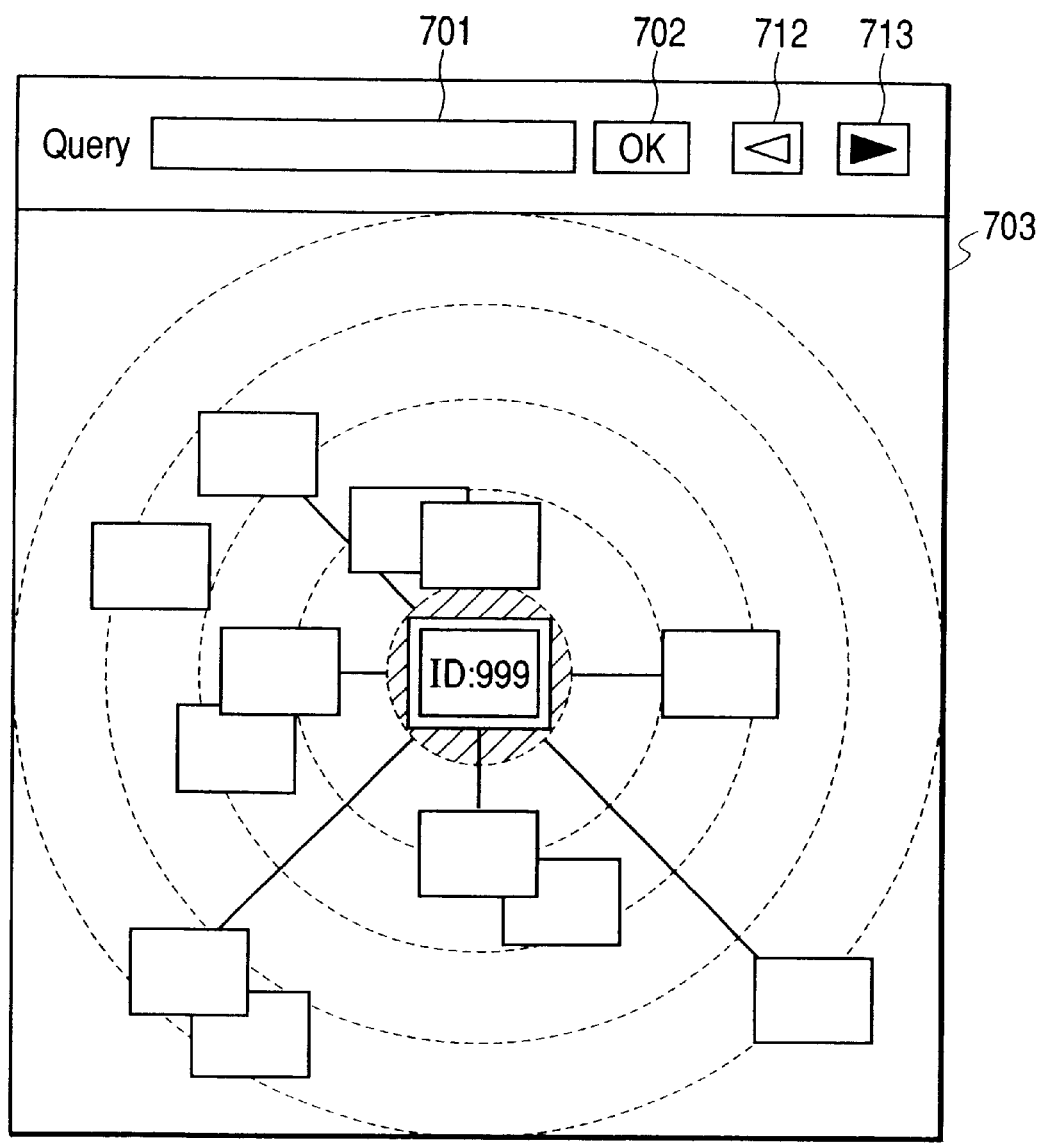
FIG. 9 is an explanatory diagram showing an example of a screen configuration of the first search result in the case where a similar search is performed by the information searching apparatus according to the embodiment of the invention.

FIGS. 7, 8, and 9 are diagrams each showing an example of a configuration of a screen which is displayed on the display 208 by the information search program 603 and are explanatory diagrams each showing the operation for searching an image by using the information search program 603 in the information searching apparatus according to the embodiment of the invention.

In FIG. 7, reference numeral 701 denotes a query box for inputting a query and shows a state where "red apple" has been inputted as a query. Reference numeral 702 denotes a search button for instructing the search. By clicking the search button 702 by using the mouse 209, the image database 604 is searched by the query stored in the query box 701 and a search result is displayed in a search result display area shown at 703.

The search result display area 703 is a square area having a size of, for example, 600 dots (vertical)×600 dots (lateral). A rectangle shown at 704, 705, or the like indicates a searched image. A size of each image is displayed by, for example, 60 dots (vertical)×60 dots (lateral). An actual image is not shown in FIGS. 7 to 9 for convenience of explanation. As shown at 704, a numeral such as "ID:234" or the like shown in the rectangle indicates that an image ID of the image of 704 is equal to "234". A hatched circular area shown at 706 is a matching area for displaying images which completely satisfy the searching conditions. The images displayed in the matching area 706 are the images which completely satisfy the searching conditions.

A broken line circle shown at 707 or 708 denotes a scale to indicate a degree at which the image satisfies the searching conditions. In the embodiment, it is assumed that the degree of satisfying the searching conditions is expressed by "similarity". The similarity in case of completely satisfying the conditions is equal to 1.0. The similarity in the case where the conditions are not satisfied at all is equal to 0. Reference numeral 707 shows the scale of "similarity 0.9" and 708 indicates the scale of "similarity 0.8". The matching area 706 shows that the similarity is equal to 1.0. In the embodiment, the scale is displayed at a pitch of "similarity 0.1". As will be understood from the diagrams, as the image is away from the center of the search result display area 703, the similarity decreases. That is, the image in which the degree of satisfying the searching conditions is higher is displayed at a position closer to the center of the search result display area 703. The image in which the degree of satisfying the searching conditions is lower is displayed at a position farther from the center of the search result display area 703.

The images of the image IDs "567, 765, 851" are displayed in a slightly overlapped state. This means that those images are mutually analogous and form one group. The image shown at 705 and an image shown at 711 are coupled by a straight line shown at 710. This straight line is called a group coupling line. It shows that the images which are coupled by a straight line although they are not overlapped as mentioned above are also analogous and form one group. In each group, a straight line is certainly extended from one image toward the center of the search result display area 703. This straight line is called a representative line. The image having the representative line is called a representative image.

For example, the image 711 is a representative image and has a representative line shown at 709. The representative image shows that the similarity is the highest in the group. In each group, a center distance between the representative image and the other image indicates the similarity with the representative image. When the similarity with the representative image is high, like images having image IDs "567, 765, 851", no group coupling line is displayed and each image is overlappingly displayed. As shown by the image 704, even if it is one image, it is regarded that it forms a group and a representative line is displayed. Reference numeral 712 denotes a previous screen button for displaying an image whose similarity is higher than that of each image displayed in the search result display area 703.

In FIG. 7, since the first search result display area 703 obtained when the search is made to the query "red apple" is shown, an image whose similarity is higher than that of the image displayed here does not exist, and a triangle of the previous screen button 712 is displayed in white (blank area). Reference numeral 713 denotes a next screen button for displaying an image whose similarity is lower than that of each image displayed in the search result display area 703. Since the next screen exists, a triangle of the next screen button 713 is displayed in black.

FIG. 8 is a diagram showing a state of the display 208 after the next screen button 713 was clicked by using the mouse 209 in the state shown in FIG. 7. Reference numerals 801, 802, and 803 denote scales showing the similarities "0.8, 0.7, 0.6", respectively. A distance between the scales 802 and 803 is shorter than a distance between the scales 801 and 802 because no image is displayed in an area between the scales 802 and 803. An interval of the scales and a size of matching area inside the scale 801 are smaller than those in FIG. 7 because no image is displayed in the area inside the scale 801. The triangle of the previous screen button 712 is displayed in black because the image having the high similarity exists. However, the triangle of the next screen button 713 is displayed in white because the image whose similarity is lower than that does not exist.

FIG. 9 is a diagram showing a state of the display 208 after the image 711 was clicked by using the mouse 209 in the state of FIG. 7. When the image displayed in the search result display area 703 is clicked by using the mouse 209, images similar to the clicked image are searched and a search result is displayed in the search result display area 703. The query box 701 is cleared since the query corresponding to the search result does not exist. In place of it, the image 711 which becomes a search base is displayed in the matching area. In this instance, the image 711 is displayed by a double-frame image in order to distinguish it from the image in case of searching by the query. An interval of scales is narrower than that in the state of FIG. 7.

FIG. 10 is an explanatory diagram showing a construction of the image database 604 read in the RAM 203 of the information searching apparatus according to the embodiment of the invention. The image ID and a name and an explanation of an image file corresponding to the image ID are allowed to correspond to each other to thereby form one item, and a plurality of items have been stored in the image database 604. For example, the image ID "0", image file "0000000.jpg", and explanation "a red apple" have been stored as one item in the diagram so as to correspond to each other.

The image ID denotes a number for identifying the image stored in the image database. The numbers are allocated to the images in ascending order from 0, namely, in accordance with the order in which image has been stored in the image database. Therefore, the maximum value of the image IDs stored in the image database coincides with the value obtained by subtracting "1" from the number of images stored in the image database. The image file denotes information indicative of a storage location in the file of the image data registered in the image database. Therefore, by obtaining the image data from the image file, the image can be displayed onto the display 208. The explanation is a sentence describing the corresponding image. The information search program 603 searches a desired image from the image display 208 by using the explanation. The respective items have been sorted in ascending order by the image IDs.

FIG. 11 is an explanatory diagram showing a construction of the matching area data 605 read in the RAM 203 of the information searching apparatus according to the embodiment of the invention. Data to change a size of matching area as shown at 706 in FIG. 7 in accordance with the number of images which are displayed in the matching area has been stored in the matching area data 605. As shown in FIG. 11, the matching area data has a one-dimensional array, the number of images which are displayed in the matching area corresponds as a suffix of the array, and the number of dots of the radius of the matching area is stored as an element of the array. The correspondence between the number of images which are displayed in the matching area and the size of radius of the matching area is predetermined so that the images which are displayed in the matching area can be displayed without mutually being overlapped.

For example, it will be understood from FIG. 11 that when the number of images which are displayed in the matching area is equal to 0, the radius of the matching area is equal to 30 dots, when the number is equal to 1, the radius is equal to 60 dots, when the number is equal to 2, the radius is equal to 90 dots, and when the number is equal to 3, the radius is equal to 120 dots.

FIG. 12 is an explanatory diagram showing a construction of the matching image data 606 read into the RAM 203 of the information searching apparatus according to the embodiment of the invention. Coordinates of the center of the image to display the image having the similarity of 1.0 which is displayed in the matching area 706 in FIG. 7 have been stored in the matching image data 606 in correspondence to the number of images which are displayed in the matching area. That is, in case of displaying one image into the matching area, one coordinates data is stored. In case of displaying two images into the matching area, two coordinates are stored. In case of displaying three images into the matching area, three coordinates are stored. In this manner, in correspondence to the number of images which are displayed in the matching area, the same number of coordinates are stored in correspondence to each other. As for each coordinates, the coordinates in the case where the center of the matching area is set to the origin, the horizontal direction on the right side facing the screen is set to an x axis, and the vertical direction on the upper side is set to a y axis have been stored. The coordinates of each image are predetermined so that the images, which are displayed in the matching area are displayed without being mutually overlapped.

For example, it will be understood from FIG. 12 that in case of displaying one image into the matching area 706, the information to be displayed has been stored at the position of coordinates (0, 0), in case of displaying two images, the information to be displayed has been stored at the positions of coordinates (0, 35) and (0, 35), and in case of displaying three images, the information to be displayed has been stored at the positions of coordinates (0, 35), (45, 35), and (45, 35).

FIG. 13 is an explanatory diagram showing a construction of the radius increment data 607 read into the RAM 203 of the information searching apparatus according to the embodiment of the invention. The radius increment data 607 is used to decide an interval of the scales such as 707, 708, or the like in FIG. 7. The interval of the scales is determined by the number of images which are displayed between two scales. Therefore, a plurality of items in each of which the number of images which are displayed between the scales and the interval of the scales are allowed to correspond to each other have been stored in the radius increment data 607 and sorted in ascending order on the basis of the number of images. As for the interval of the scales, the radius increment amount with the scale that is larger than the target scale by 0.1 is stored as the number of dots.

For example, it will be understood from FIG. 13 that when the number of images is equal to 0, the scale whose radius is increased by 30 dots is displayed, when the number of images is equal to a value within a range from 1 to 4, the scale whose radius is increased by 60 dots is displayed, and when the number of images is equal to a value within a range from 5 to 10, the scale whose radius is increased by 90 dots is displayed.

FIG. 14 is an explanatory diagram showing a construction of the allocation angle data 608 held in the RAM 203 of the information searching apparatus according to the embodiment of the invention. The allocation angle data 608 is used to decide the position of the representative image which is displayed in the search result display area. Assuming that an angle in the horizontal rightward direction from the center of the search result display area is equal to 0° (degree), the allocation angle data 608 specifies the angle adapted to display the representative image. The allocation angle data 608 has a one-dimensional array and the angles adapted to display the representative images are stored in order of displaying the representative image from the head of the array.

For example, it will be understood from FIG. 14 that the representative image to be displayed first is displayed in the direction of 90° (degree), the representative image to be displayed second is displayed in the direction of 270° (degree), the representative image to be displayed third is displayed in the direction of 180° (degree), and the representative image to be displayed fourth is displayed in the direction of 0° (degree).

FIG. 15 is an explanatory diagram showing a construction of the similar image buffer 609 held in the RAM 203 of the information searching apparatus according to the embodiment of the invention. A result of the search of the image database 604 is stored in the similar image buffer 609. In response to one image as a search result, the image ID and the similarity are stored in correspondence to each other. The searched images are stored in descending order in accordance with the similarity. The similarity has a value in a range from 1.0 to 0.0 as mentioned above. The larger value denotes the higher similarity. The similarity of 1.0 indicates that the image is completely matched.

For example, it will be understood from FIG. 15 that three images of the image IDs "0, 456, 789" have been searched at the similarity of 1.0, the image of the image ID "123" has been searched at the similarity of 0.952, and the like.

Figures 16, 17, 18:
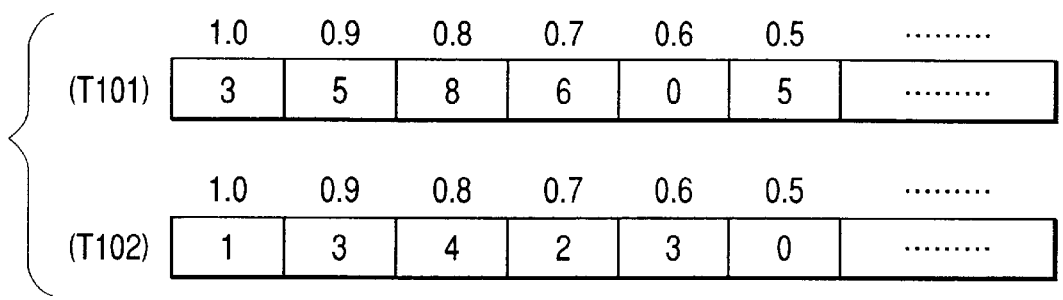
FIG. 16 is an explanatory diagram showing a construction of similar image information held in the RAM of the information searching apparatus according to the embodiment of the invention.
FIG. 17 is an explanatory diagram showing a construction of distribution information held in the RAM of the information searching apparatus according to the embodiment of the invention.
FIG. 18 is an explanatory diagram showing a construction of group information held in the RAM of the information searching apparatus according to the embodiment of the invention.

FIG. 16 is an explanatory diagram showing a construction of the similar image information 610 held in the RAM 203 of the information searching apparatus according to the embodiment of the invention. As for all of the images stored in the image database 604, the similarities with the other images are calculated and the obtained similarities are stored as a similar image list in correspondence to each image. As shown in FIG. 16, each similar image list is stored in order from the similar image list corresponding to the image ID (IDO) in ascending order from the head of the similar image information. A structure of each similar image list is substantially the same as that of the similar image buffer 609 shown in FIG. 15.

FIG. 17 is an explanatory diagram showing a construction of the distribution information 611 held in the RAM 203 of the information searching apparatus according to the embodiment of the invention. The distribution information 611 is used to store a distribution of the numbers of images existing between the respective scales when the searched result is displayed. (T101) indicates distribution information in the case where the image is searched by using "red apple" as a query. (T102) indicates distribution information in the case where the image similar to the image of the image ID "999" is searched. It will be understood from (T101) that there are three images having the similarity of 1.0, there are five images having similarities of (0.9≦similarity<1.0), and there are eight images having similarities of (0.8≦similarity<0.9).

FIG. 18 is an explanatory diagram showing a construction of the group information 612 held in the RAM 203 of the information searching apparatus according to the embodiment of the invention. The, group information 612 is used to group the images. As images which are stored in the group information 612, the images other than the representative image are stored. The image ID of each of those images, the image ID of the representative image in the group to which those images belong, and the similarity between the image and the representative image are stored in correspondence to each other.

For example, it will be understood from FIG. 18 that the image of the image ID "345" belongs to the group in which the image ID "876" is the representative image ID and the similarity between the image of the image ID "345" and the representative image of the image ID "876" is equal to 0.928. The images stored in the group information 612 are stored in ascending order on the basis of the representative image ID.

FIGS. 19 and 20 are explanatory diagrams each showing a construction of the screen information 613 held in the RAM 203 of the information searching apparatus according to the embodiment of the invention. The screen information 613 is used to store information of each screen to be displayed in the search result display area in response to the search result. The number of screens necessary to display all search results, a range of the screen to be displayed in each screen, a layout of the scales of each screen, and the like can be obtained. (T201) indicates screen information in the case where the image is searched by using "red apple" as a query. (T202) indicates screen information in the case where the image similar to the image of the image ID "999" is searched.

A suffix of the array of the distribution information 611 for indicating the image to start the display and a width of scale are stored every screen into the screen information 613 in correspondence to each other. As a width of scale, the width from the radius of the matching area, namely, from the radius of the scale of the similarity of 1.0 to the adjacent scale, namely, the difference of the radius is stored in order on the basis of the number of dots. "−1" is stored for the scale which is not displayed on the screen.

For example, it will be understood from (T201) that as for the first screen, the display is started from the image corresponding to the suffix "0" of the array of the distribution information 611, namely, from the image having the similarity of 1.0. It will be also understood that the size of radius of the matching area of the first screen is equal to 120 dots, the radius of the scale having the similarity of 0.9 is increased by 90 dots larger than the matching area, the radius of the scale having the similarity of 0.8 is increased by 90 dots than that of the scale having the similarity of 0.9, and the scales having the similarity of 0.7 and subsequent similarities are not displayed. It will be also understood that as for the next screen, the display is started from the image corresponding to the suffix 3 of the array of the distribution information 611, namely, from the image whose similarity is smaller than 0.8.

It will be also understood that the size of radius of the matching area of the first screen is equal to 30 dots, the radius of the scale having the similarity of 0.9 is increased by 30 dots than the matching area, the radius of the scale having the similarity of 0.8 is increased by 30 dots than the scale having the similarity of 0.9, the radius of the scale having the similarity of 0.7 is increased by 90 dots than the scale having the similarity of 0.8, the radius of the scale having the similarity of 0.6 is increased by 90 dots than the scale having the similarity of 0.7, the radius of the scale having the similarity of 0.5 is increased by 90 dots than the scale having the similarity of 0.6, and the scales having the similarity of 0.4 and subsequent similarities are not displayed.

Figure 21:
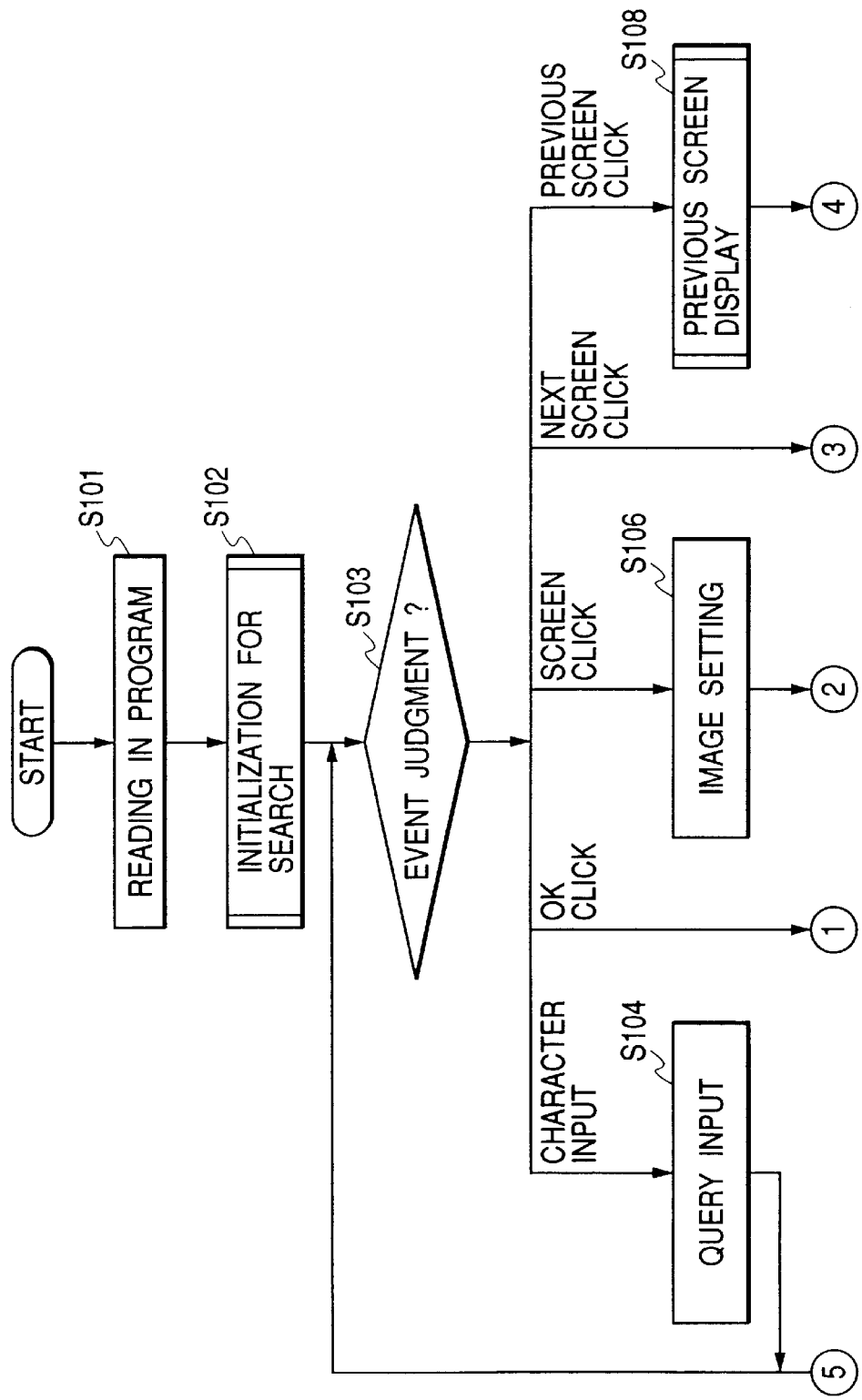
FIG. 21 is a flowchart showing an information searching method in the information searching apparatus according to the embodiment of the invention.
Figure 22:
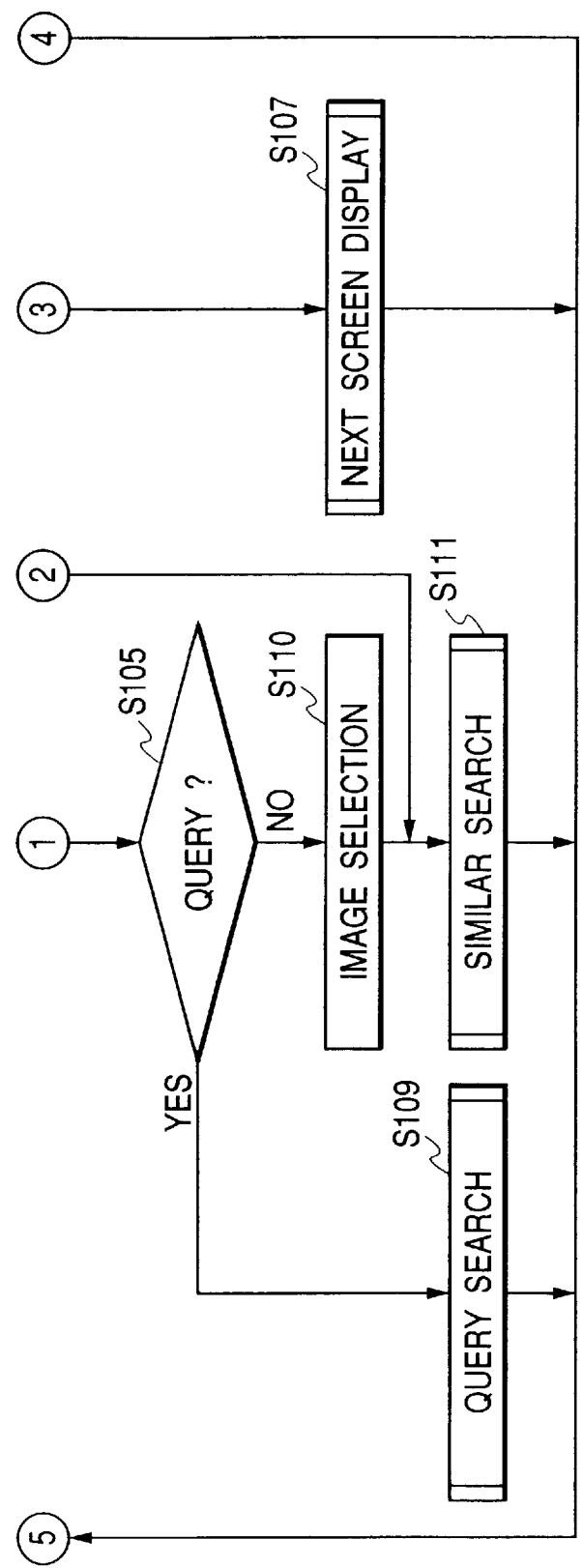
FIG. 22 is a flowchart showing the information searching method in the information searching apparatus according to the embodiment of the invention.

The operation of the information search program of the information searching apparatus according to the embodiment of the invention constructed as mentioned above will now be described with reference to flowcharts of FIGS. 21 and 22. FIGS. 21 and 22 are flowcharts showing an information search method in the information searching apparatus according to the embodiment of the invention.

First, in step S101, the information search program 501 stored in the CD-ROM 205 of the information searching apparatus and the image database 502 as its associated data, matching area data 503, radius increment data 505, and allocation angle data 506 are loaded from the CD-ROM drive 204 into the RAM 203. Further, the areas for the similar image buffer 609, similar image information 610, distribution information 611, group information 612, screen information 613 are held in the RAM 203.

Subsequently, in step S102, the control is shifted to the information search program 501, and the information search program 501 performs the initialization necessary to search. That is, image database 604 is respectively searched by using all of the images stored in the image database 604 and search results are stored in the similar image information 610. The details of the present processes will be described hereinbelow with reference to FIGS. 23 and 24.

Subsequently, in step S103, the processing routine is branched in accordance with an event generated. When such an event that the character key is depressed by using the keyboard 207 is generated, the processing routine is branched to step S104. When such an event that the OK button 702 shown in FIG. 7 is clicked by using the mouse 209 is generated, the processing routine is branched to step S105. When such an event that the image 704, 705, or the like shown in FIG. 7 is clicked by using the mouse 209 is generated, the processing routine is branched to step S106. When such an event that the next screen button 713 shown in FIG. 7 is clicked by using the mouse 209 is generated, the processing routine is branched to step S107. When such an event that the previous screen button 712 shown in FIG. 7 is clicked by using the mouse 209 is generated, the processing routine is branched to step S108.

Step S104 denotes a process in the case where the query is inputted. The character depressed in step S103 is fetched and displayed into the query box 701 shown in FIG. 7. When the process is finished, step S103 follows. Step S105 denotes a process in the case where the execution of the search by using the query displayed in the query box 701 is instructed. In step S105, the processing routine is branched in accordance with whether the query has been inputted to the query box 701 or not. That is, if a character exists in the query box 701, the image can be searched by using the query. Therefore, step S109 follows and the search using the query is performed. If no character exists in the query box 701, the search cannot be performed by using the query. Therefore, step S110 follows and the search is performed by using the images selected at random.

Step S106 relates to a process in the case where the search by using a specific image has been instructed. The image ID corresponding to the clicked image is obtained and stored into a comparison base ID. The comparison base ID is held in the RAM 203. When the process is finished, step S111 follows. Step S107 relates to a process in the case where the displayof the next screen of the search result has been instructed. The details of this process will be described hereinlater in FIG. 28. Step S108 relates to a process in the case where an instruction to display the previous screen of the search result is issued. The details of this process will be described hereinlater in FIG. 29. Step S109 relates to a process for searching the image database 604 by using the character train stored in the query box 701 and displaying a search result onto the display 208. The details of this process will be described hereinlater in FIGS. 25 and 26. When the process is finished, step S103 follows.

In step S110, the image is selected at random from the image database 604 and the image ID corresponding to the selected image is stored into the comparison base ID. The comparison base ID is held in the RAM 203. When the process is finished, step S111 follows. Step S111 relates to a process for displaying the image similar to the image selected in step S106 or S110 onto the display 208. Since the similar image has already been stored in the similar image buffer 609 in step S106 or S110, in particular, the process for searching the similar image is not performed. The details of this process will be described hereinlater in FIG. 27. When the process is finished, step S103 follows.

Figure 23:
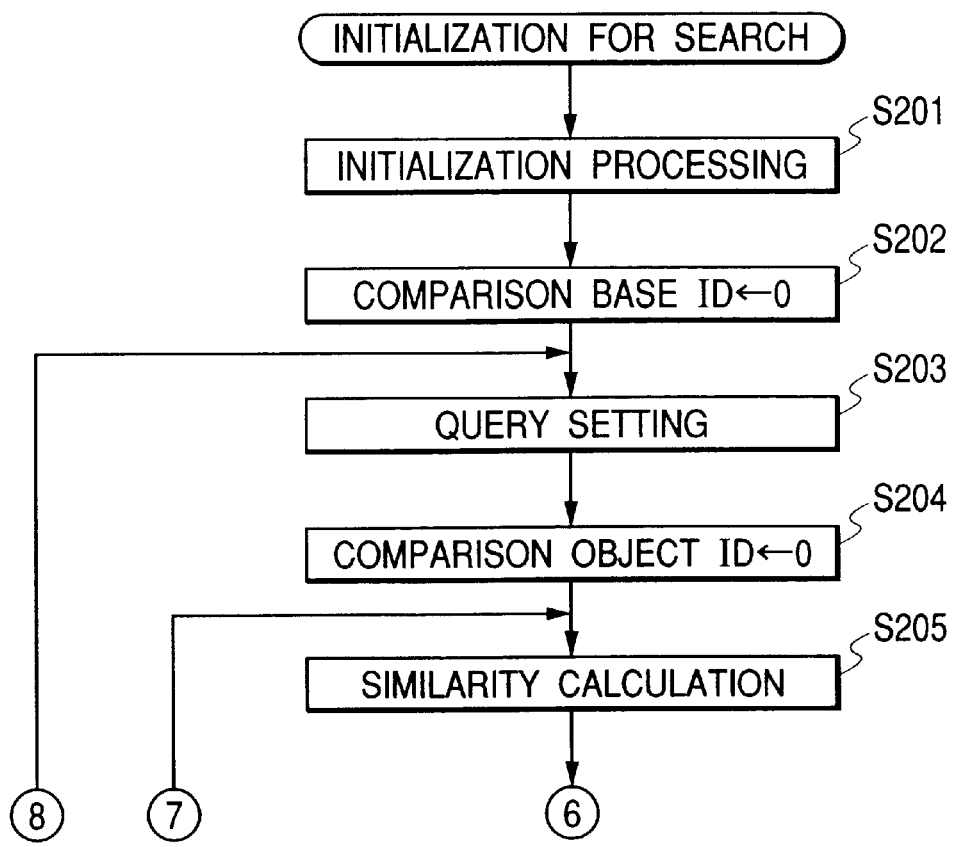
FIG. 23 is a flowchart showing a search initializing method in the information searching apparatus according to the embodiment of the invention.
Figure 24:
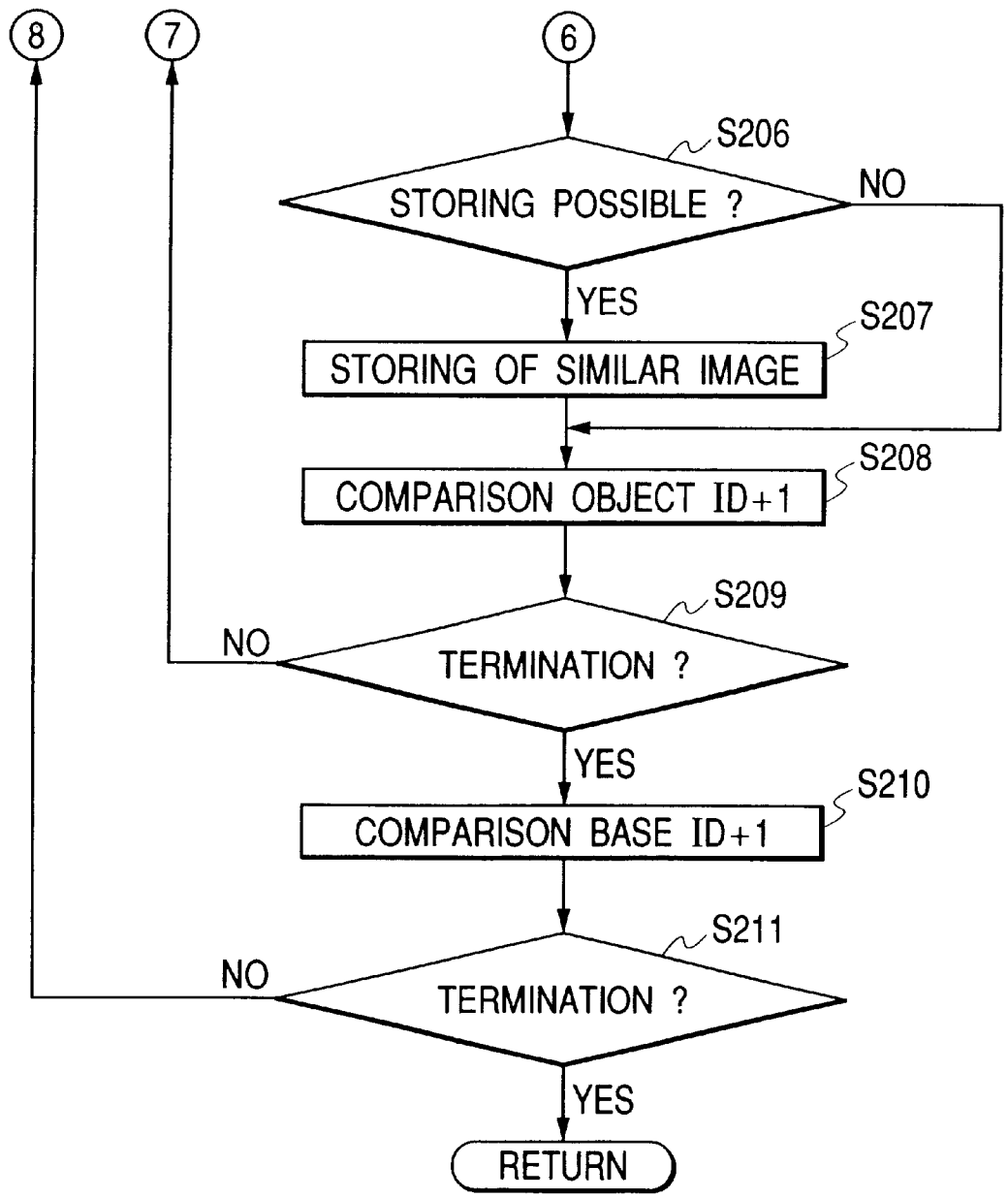
FIG. 24 is a flowchart showing the search initializing method in the information searching apparatus according to the embodiment of the invention.

FIGS. 23 and 24 are flowcharts for explaining the search initialization process in step S102 mentioned above. In this process, necessary various initialization processes are executed. The similar image is searched with regard to all of the images stored in the image database 604 and the search result is stored into the similar image information 610. The details of this process will be described hereinlater.

In step S201, various initialization processes are performed. That is, the information such as similar image buffer 609, similar image information 610, distribution information 611, group information 612, screen information 613 and the like held in the RAM 203 is initialized. The other initialization is performed as necessary. When the process is finished, step S202 follows. In step S202, the initial value "0" is stored into the comparison base ID showing the image of the comparison base. The comparison base ID is held in the RAM 203. When the process is finished, step S203 follows. In step S203, in order to search the image similar to the image in the comparison base, an explanation of the image in the comparison base is stored in the query buffer. The explanation corresponding to the comparison base ID is obtained from the image database 604 and copied into a query buffer. The query buffer is held in the RAM 203. When the process is finished, step S204 follows.

In step S204, the initial value 0 is stored into a comparison object ID indicative of the image of a comparison object. The comparison object ID is held in the RAM 203. When the process is finished, step S205 follows. In step S205, a similarity between the image shown by the comparison base ID and the image shown by the comparison object ID is calculated. The similarity is calculated from an explanation for the image corresponding to the comparison base ID and an explanation for the image corresponding to the comparison object ID. The explanation for the image corresponding to the comparison base ID has been stored in the query buffer. The explanation for the image corresponding to the comparison object ID can be obtained from the image database 604. Since the method of obtaining the similarity between the two sentences is a general way in the field of the information search, its detailed description is not particularly made here. However, a normalization is performed so that the maximum value of the similarity is equal to 1.0 and the minimum value is equal to 0.0. When the similarity is obtained, step S206 follows.

Step S206 relates to a process for discriminating whether the image shown by the comparison object ID can be stored into the similar image buffer 609 or not and this processing step is branched in accordance with a discrimination result. If the similar image buffer 609 is not full, it is decided that the image can be unconditionally stored. When the similar image buffer 609 is full, the value of the similarity of the item at the end in the similar image buffer is compared with the value of the similarity obtained in step S205. If the value of the similarity obtained in step S205 is larger, it is determined that the image can be stored. If it is not larger, it is decided that no image can be stored. When it is determined that the image can be stored, step S207 follows. When it is determined that the image cannot be stored, step S208 follows.

Step S207 relates to a process for storing the comparison object ID into the similar image buffer 609 in correspondence to the similarity calculated in step S205. The items in the similar image buffer 609 are stored so as to be sorted in descending order in accordance with the similarity. When the similar image buffer 609 is full, the end item in the similar image buffer 609 is abandoned. When the process is finished, step S208 follows. Step S208 relates to a process for counting up the value of the comparison object ID by "1" and changing the image of the comparison object to the next image in the image database 604. When the process is finished, step S209 follows. Step S209 relates to a process which is branched in accordance with whether all of the images in the image database 604 have been compared with the image of the comparison base or not. When the value of the comparison object ID is larger than the value of the end image ID stored in the image database 604, since this means that all of the images have been compared, step S210 follows. If NO, step S205 follows.

Step S210 relates to a process for counting up the value of the comparison base ID by "1" and changing the image of the comparison base to the next image in the image database 604. When the process is finished, step S211 follows. Step S211 relates to a process which is branched in accordance with whether the similar image has been obtained for all of the images in the image database 604 or not. When the value of the comparison base ID is larger than the value of the end image ID stored in the image database 604, since this means that the process has been performed for all of the images, the search initialization process in step S102 is finished. If NO, step S203 follows.

Figure 25:
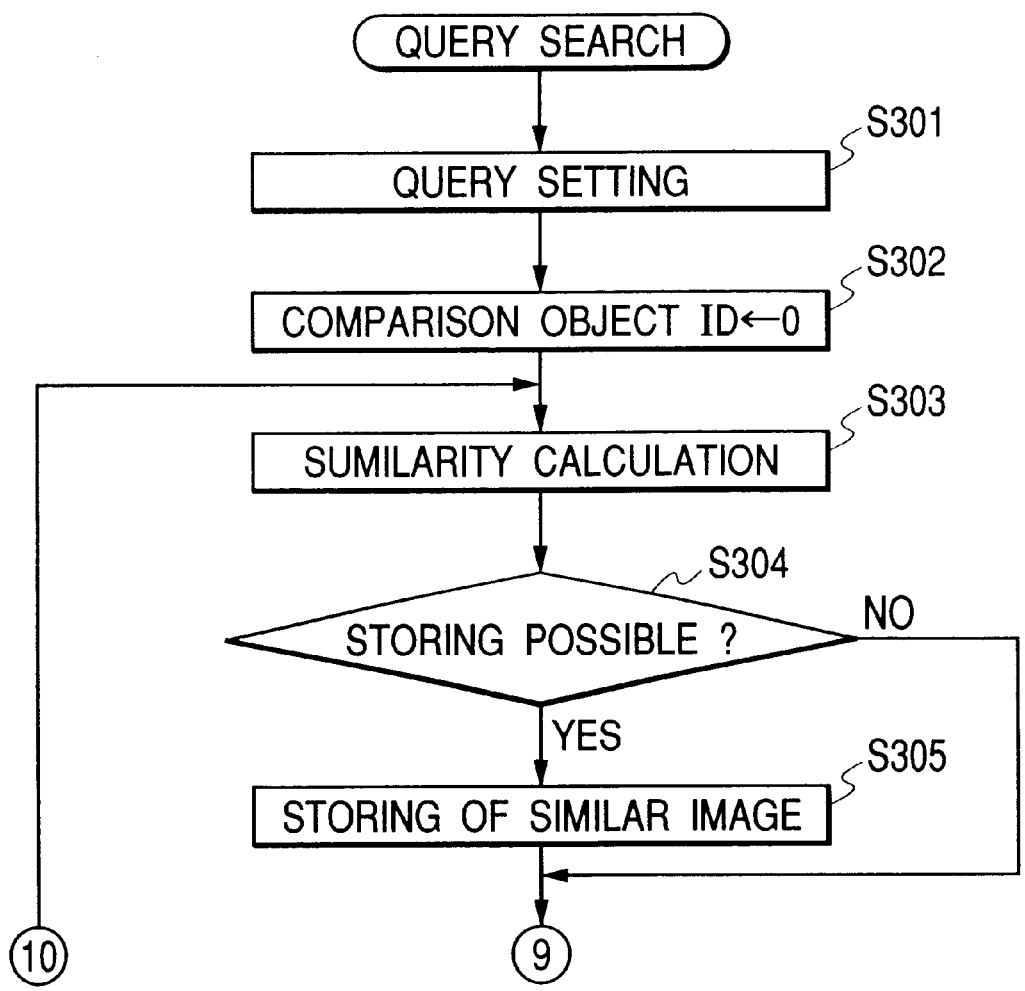
FIG. 25 is a flowchart showing a query searching method in the information searching apparatus according to the embodiment of the invention.
Figure 26:
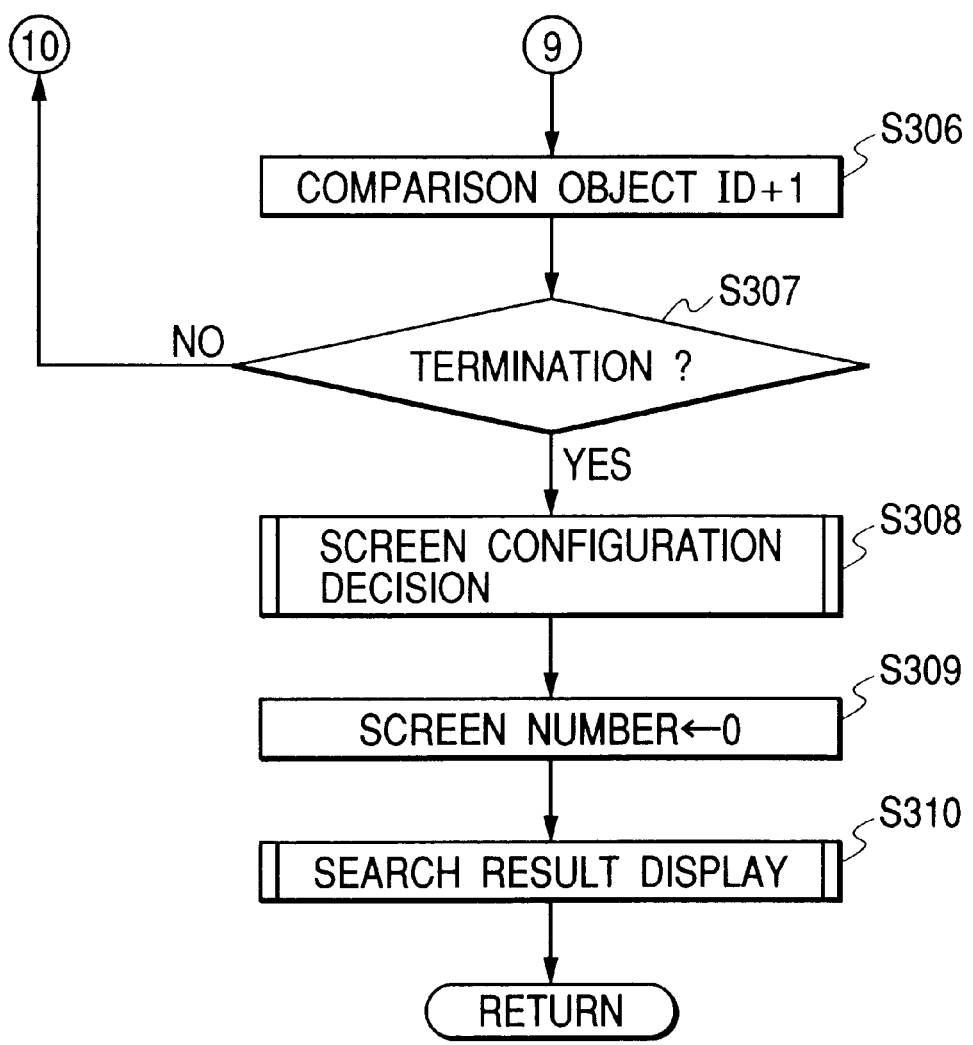
FIG. 26 is a flowchart showing the query searching method in the information searching apparatus according to the embodiment of the invention.

FIGS. 25 and 26 are flowcharts for explaining the process for the query search in step S109. In this process, the image database 604 is searched by using the query stored in the query box 701 and a search result is displayed on the display 208. The details of this process will be described hereinbelow.

In step S301, the character train stored in the query box 701 is copied into the query buffer. The query buffer is held in the RAM 203. When the process is finished, step S302 follows. In step S302, the initial value 0 is stored in the comparison object ID indicative of the image of the comparison object. The comparison object ID is held in the RAM 203. When the process is finished, step S303 follows. In step S303, a similarity between the sentence stored in the query buffer and the explanation of the image corresponding to the comparison object ID is calculated. The explanation for the image corresponding to the comparison object ID can be obtained from the image database 604. Since the method of obtaining the similarity between the two sentences is a general way in the field of the information search, its detailed description is not particularly made here. However, a normalization is performed so that the maximum value of the similarity is equal to 1.0 and the minimum value is equal to 0.0. When the similarity is obtained, step S304 follows.

Step S304 relates to a process for discriminating whether the image shown by the comparison object ID can be stored into the similar image buffer 609 or not and this processing step is branched in accordance with a discrimination result. If the similar image buffer 609 is not full, it is decided that the image can be unconditionally stored. When the similar image buffer 609 is full, the value of the similarity of the end item in the similar image buffer is compared with the value of the similarity obtained in step S303. If the value of the similarity obtained in step S303 is larger, it is determined that the image can be stored. If it is not larger, it is decided that no image can be stored. When it is determined that the image can be stored, step S305 follows. When it is determined that the image cannot be stored, step S306 follows.

Step S305 relates to a process for storing the comparison object ID into the similar image buffer 609 in correspondence to the similarity calculated in step S303. The items in the similar image buffer 609 are stored so as to be sorted in descending order in accordance with the similarity. When the similar image buffer 609 is full, the end item in the similar image buffer is abandoned. When the process is finished, step S306 follows. Step S306 relates to a process for counting up the value of the comparison object ID by "1" and changing the image of the comparison object to the next image in the image database 604. When the process is finished, step S307 follows. Step S307 relates to a process which is branched in accordance with whether all of the images in the image database 604 have been compared with the query or not. When the value of the comparison object ID is larger than the value of the end image ID stored in the image database 604, since this means that all of the images have been compared, step S308 follows. If NO, step S303 follows.

Step S308 relates to a process for deciding a configuration of the screen for displaying a search result from the search result stored in the similar image buffer 609 and outputting the information of the decided screen configuration to the screen information 613. The details of this process will be explained later in FIG. 30. When the process is finished, step S309 follows. Step S309 relates to a process for substituting "0" into the screen number in order to display the first screen of the search result. The screen number is held in the RAM 203. When the process is finished, step S310 follows. Step S310 relates to a process for displaying a search result onto the display 208 on the basis of the screen configuration stored in the screen information 613 and the search result stored in the similar image buffer 609. The details of this process will be described hereinbelow in FIGS. 35 and 36. When the process is finished, the process for the query search in step S109 is finished.

Figure 27:
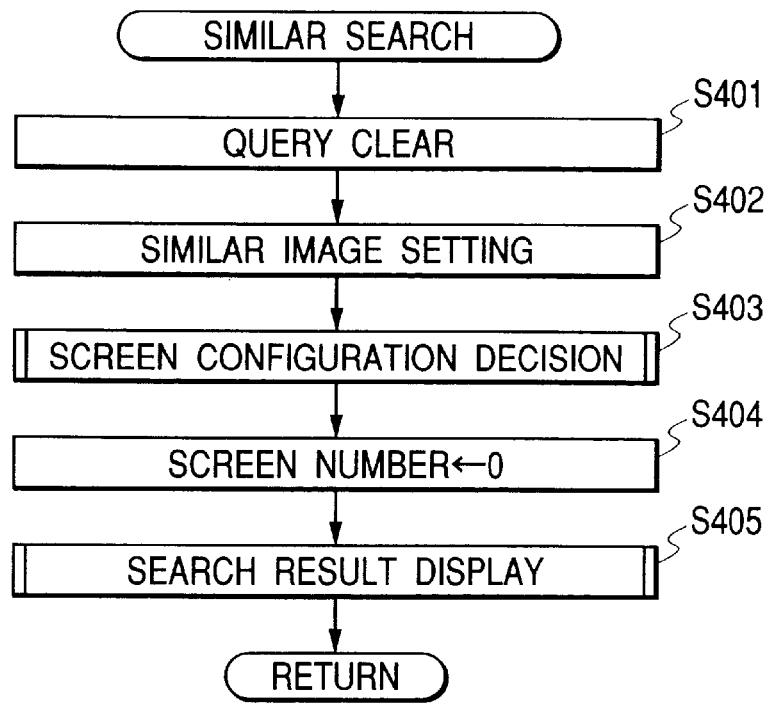
FIG. 27 is a flowchart showing a similar searching method in the information searching apparatus according to the embodiment of the invention.

FIG. 27 is a flowchart for explaining the process for the similar search in step S111. In this process, the image similar to the image stored in the comparison base ID is obtained from the similar image information 610 and the similar image is displayed on the display 208. The details of this process will be described hereinbelow.

In step S401, the character train stored in the query buffer is cleared, the query box 701 is cleared, and the similar image is displayed on the display 208. When the process is finished, step S402 follows. In step S402, a similar image list corresponding to the image ID stored in the comparison base ID is obtained from the similar image information 610 and the contents of the similar image list are copied into the similar image buffer 609. When the process is finished, step S403 follows. Step S403 relates to a process for deciding a configuration of a screen for displaying a search result from the search result stored in the similar image buffer 609 and outputting information of the decided screen configuration to the screen information 613. The details of this process will be described hereinbelow in FIG. 30. When the process is finished, step S404 follows.

Step S404 relates to a process for substituting "0" into the screen number in order to display the first screen of the search result. The screen number is held in the RAM 203. When the process is finished, step S405 follows. Step S405 relates to a process for displaying a search result onto the display 208 on the basis of the screen configuration stored in the screen information 613 and the search result stored in the similar image buffer 609. The details of this process will be described hereinbelow in FIGS. 35 and 36. When the process is finished, the process for the similar search in step S111 is finished.

Figure 28:
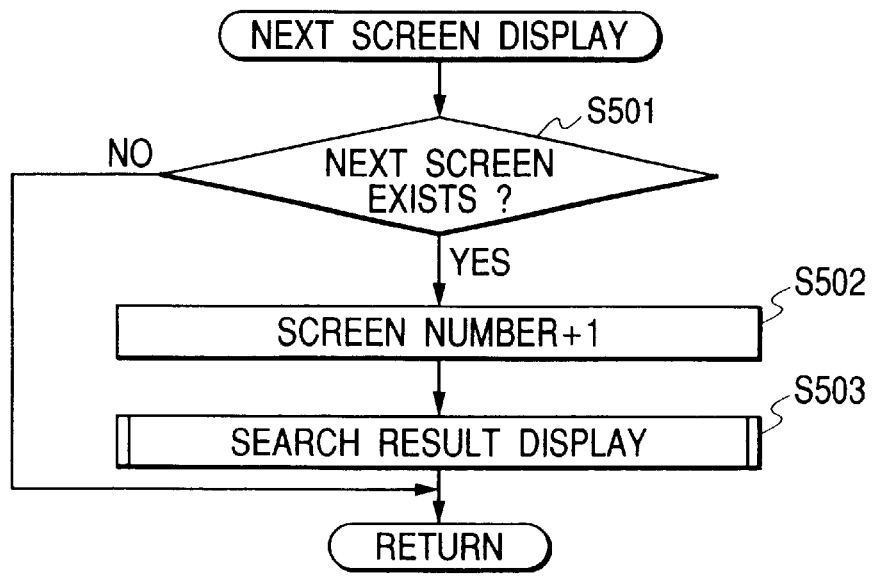
FIG. 28 is a flowchart showing a next screen display method in the information searching apparatus according to the embodiment of the invention.

FIG. 28 is a flowchart for explaining the process for displaying the next screen in step S107 mentioned above. This process is provided for displaying the next screen of the search result displayed on the display 208. The details of this process will be described hereinbelow.

Step S501 is branched in accordance with whether the next screen exists or not. If the item corresponding to the value obtained by adding "1" to the value stored in the screen number exists in the screen information 613, it is determined that the next screen exists, and step S502 follows. If the screen number does not exist in the screen information 613, it is determined that the next screen does not exist, and the process for displaying the next screen in step S107 is finished. Whether the item corresponding to the value obtained by adding "1" to the value stored in the screen number exists in the screen information 613 or not can be discriminated by checking whether the value of display start of the corresponding item is equal to 1 or not. If it is equal to 1, it is determined that such an item does not exist. If it is not equal to 1, it is determined that such an item exists.

Step S502 relates to a process for adding "1" to the value of the screen number in order to display the next screen displayed at present. When the process is finished, step S503 follows. Step S503 relates to a process for displaying the screen shown by the screen number onto the display 208 on the basis of the screen configuration stored in the screen information 613 and the search result stored in the similar image buffer 609. The details of this process will be described hereinbelow in FIGS. 35 and 36. When the process is finished, the process for displaying the next screen in step S107 is finished.

Figure 29:
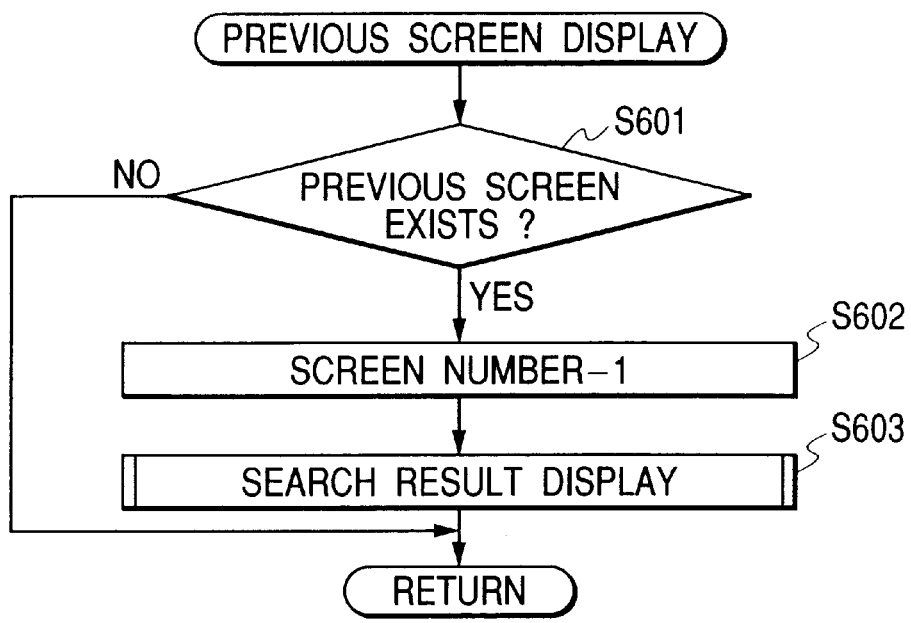
FIG. 29 is a flowchart showing a previous screen display method in the information searching apparatus according to the embodiment of the invention.

FIG. 29 is a flowchart for explaining the process for displaying the previous screen in step S108. This process is provided for displaying the previous screen of the search result displayed on the display 208. The details of this process will be described hereinbelow.

Step S601 is branched in accordance with whether the previous screen exists or not. If the value of the screen number is not equal to 0, it is determined that the previous screen exists, and step S602 follows. If the value of the screen number is equal to 0, it is determined that the previous screen does not exist, and the process for displaying the previous screen in step S108 is finished. Step S602 relates to a process for counting down the value of the screen number by "1" in order to display the previous screen displayed at present. When the process is finished, step S603 follows.

Step S603 relates to a process for displaying the screen shown by the screen number onto the display 208 on the basis of the screen configuration stored in the screen information 613 and the search result stored in the similar image buffer 609. The details of this process will be described hereinbelow in FIGS. 35 and 36. When the process is finished, the process for displaying the previous screen in step S108 is finished.

Figure 30:
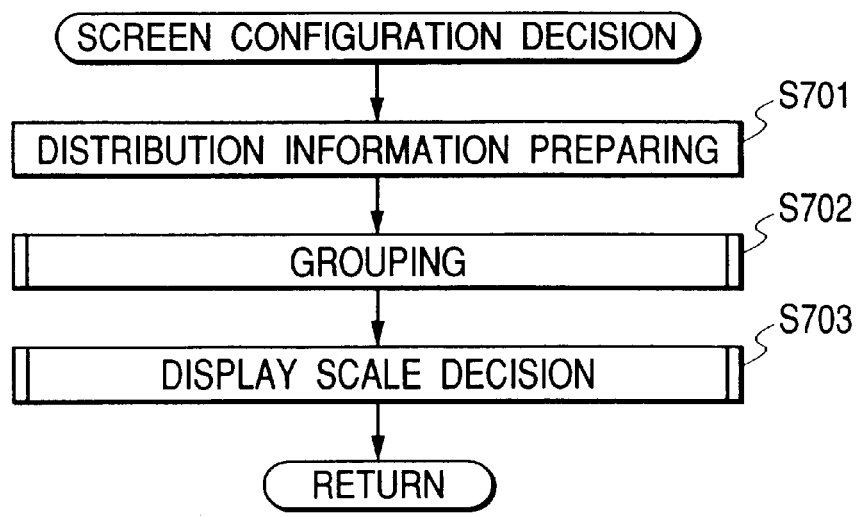
FIG. 30 is a flowchart showing a screen configuration deciding method in the information searching apparatus according to the embodiment of the invention.

FIG. 30 is a flowchart for explaining the process for the screen configuration decision in steps S308 and S403. In this process, the configuration of the screen to display the search result is determined on the basis of the information stored in the similar image buffer 609 and the information of the decided screen configuration is outputted to the screen information 613. The details of this process will be described hereinbelow.

In step S701, a distribution situation for the similarity of the image stored in the similar image buffer 609 is examined and stored into the distribution information 611. First, the number of the image IDs of the similarity of 1.0 is obtained from the similar image buffer 609 and stored in the distribution information 611. Subsequently, the number of the image IDs having the similarities of (0.9≦similarity<1.0) is obtained from the similar image buffer 609 and stored in the distribution information 611. In a manner similar to the above, the number of the image IDs stored in the similar image buffer 609 is obtained at a pitch of 0.1 and stored in the distribution information 611. When the process is finished, step S702 follows.

Step S702 relates to a process for grouping the images stored in the similar image buffer 609 in accordance with the similarities and storing a grouping result into the group information 612. The details of this process will be described hereinbelow in FIGS. 31 and 32. When the process is finished, step S703 follows. Step S703 relates to a process for deciding the scale to be displayed on each screen and storing a decision result into the screen information 613. The details of this process will be described hereinbelow in FIGS. 33 and 34. When the process is finished, the process for deciding the screen configuration is finished.

Figure 31:
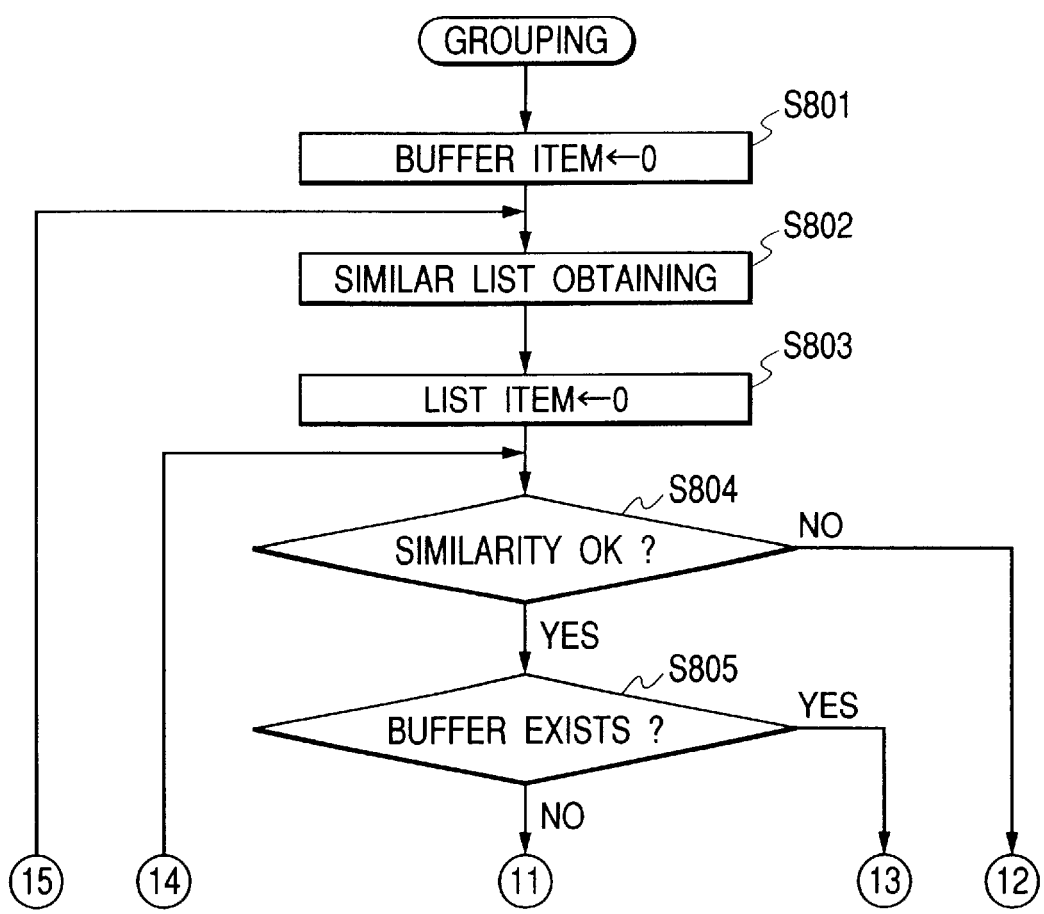
FIG. 31 is a flowchart showing a grouping method in the information searching apparatus according to the embodiment of the invention.
Figure 32:
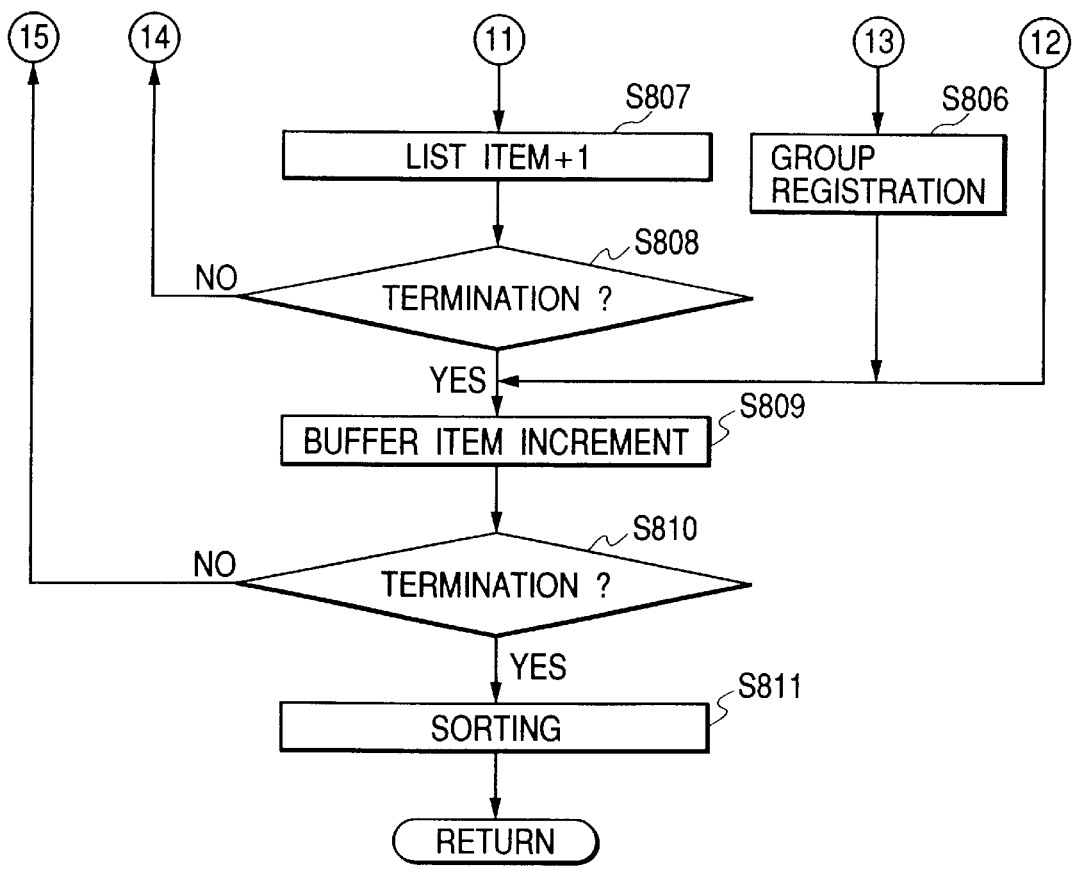
FIG. 32 is a flowchart showing the grouping method in the information searching apparatus according to the embodiment of the invention.

FIGS. 31 and 32 are flowcharts for describing the grouping process in step S702 mentioned above. The details of this process will be described hereinbelow.

In step S801, "0" is substituted into the buffer item indicative of each item in the similar image buffer 609, thereby allowing the buffer item to indicate the head item in the similar image buffer. The buffer item is held in the RAM 203. When the process is finished, step S802 follows. In step S802, a similar image list corresponding to the image ID in the similar image buffer 609 indicated by the buffer item is obtained from the similar image information 610. The similar image information 610 is an array of the similar image lists as shown in FIG. 16 and the suffix of the array shows the image ID, so that the corresponding similar image list can be easily extracted. When the process is finished, step S803 follows.

In step S803, "0" is substituted into the list item indicative of each item in the similar image list extracted in step S802, thereby allowing the list item to indicate the head item in the similar image list. The list item is held in the RAM 203. When the process is finished, step S804 follows. Step S804 is branched in accordance with whether the similarity of the item in the similar image list shown by the list item is equal to or larger than a specified value or not. If it is equal to or larger than the specified value, step S805 follows. If it is smaller than the specified value, step S809 follows. The specified value is set to, for example, 0.8.

Step S805 is branched in accordance with whether the image ID shown by the list item exists in the item in the similar image buffer existing on the head side nearer than that of the item shown by the buffer item or not. That is, if the image ID matched with the image ID of the item in the similar image list shown by the list item exists in the item in the similar image buffer corresponding to the value smaller than the value of the buffer item, step S805 is branched to step S806. If such an image ID does not exist, step S805 is branched to step S807.

In step S806, the set of the image ID corresponding to the buffer item, the image ID corresponding to the list item, and the similarity corresponding to the list item is stored in the group information 612. The image ID corresponding to the buffer item is stored into a storage area of the image ID in the group information 612, the image ID corresponding to the list item is stored into a storage area of the representative image ID in the group information 612, and the similarity corresponding to the list item is stored into a storage area of the similarity in the group information 612, respectively. When the process is finished, step S806 is branched to step S809.

In step S807, the value of the list item is counted up by "1", thereby indicating the next item in the similar image list extracted in step S802. When the process is finished, step S808 follows. Step S808 is branched in accordance with whether the item indicated by the list item is valid or not. When the item is not valid, since this means that the process has been performed to all of the valid items in the similar image list extracted in step S802, step S809 follows. When the item is valid, since it is necessary to still perform the process, step S804 follows. In step S809, the value of the buffer item is counted up by "1", thereby indicating the next item in the similar image buffer 609. When the process is finished, step S810 follows.

Step S810 is branched in accordance with whether the item indicated by the buffer item is valid or not. When the item is not valid, since this means that the process has been performed to all of the valid items in the similar image buffer 609, step S811 follows. When the item is valid, since it is necessary to still perform the process, step S802 follows. In step S811, the valid items stored in the group information 612 are sorted so as to be arranged in ascending order in accordance with the value of the representative image ID. When the process is finished, the grouping process in step S702 is finished.

Figure 33:
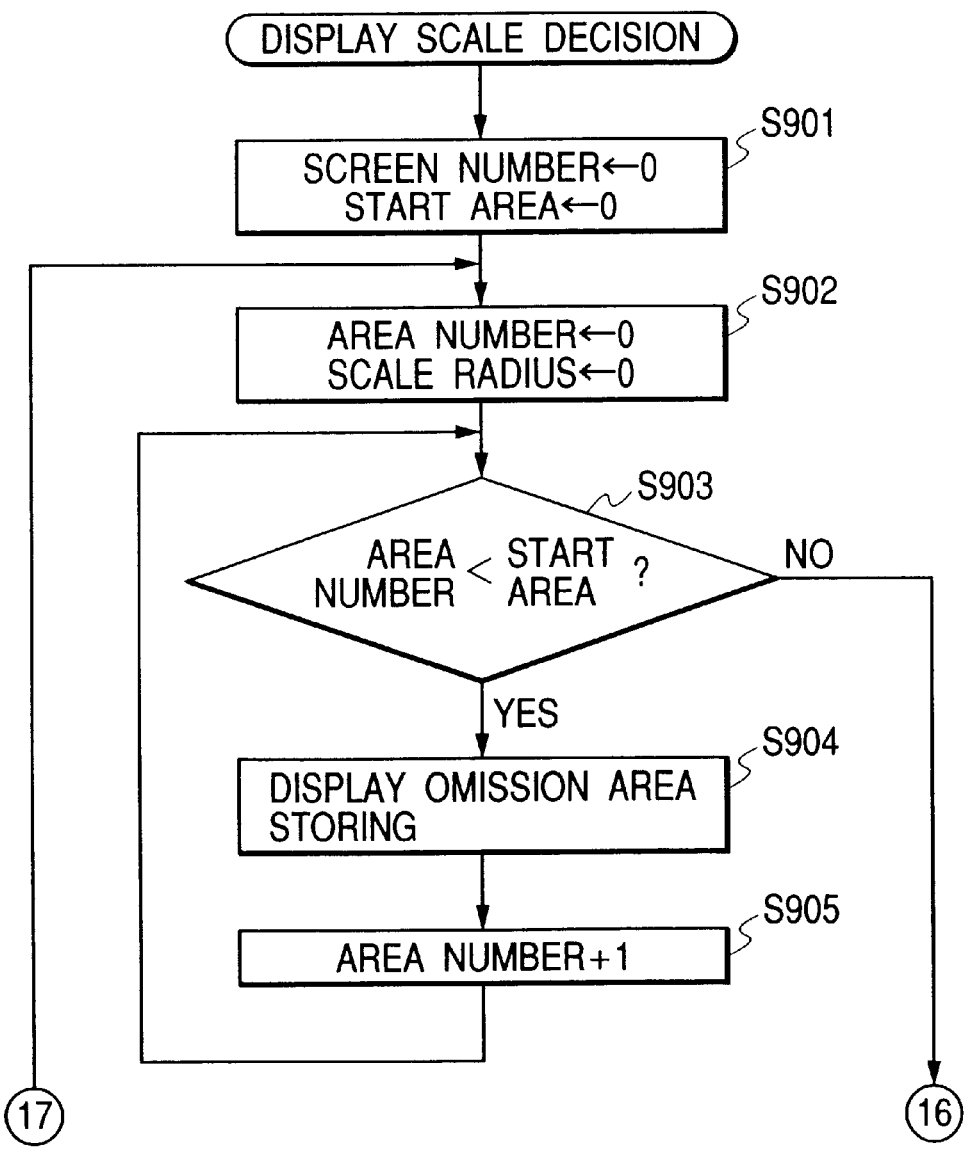
FIG. 33 is a flowchart showing a display scale deciding method in the information searching apparatus according to the embodiment of the invention.
Figure 34:
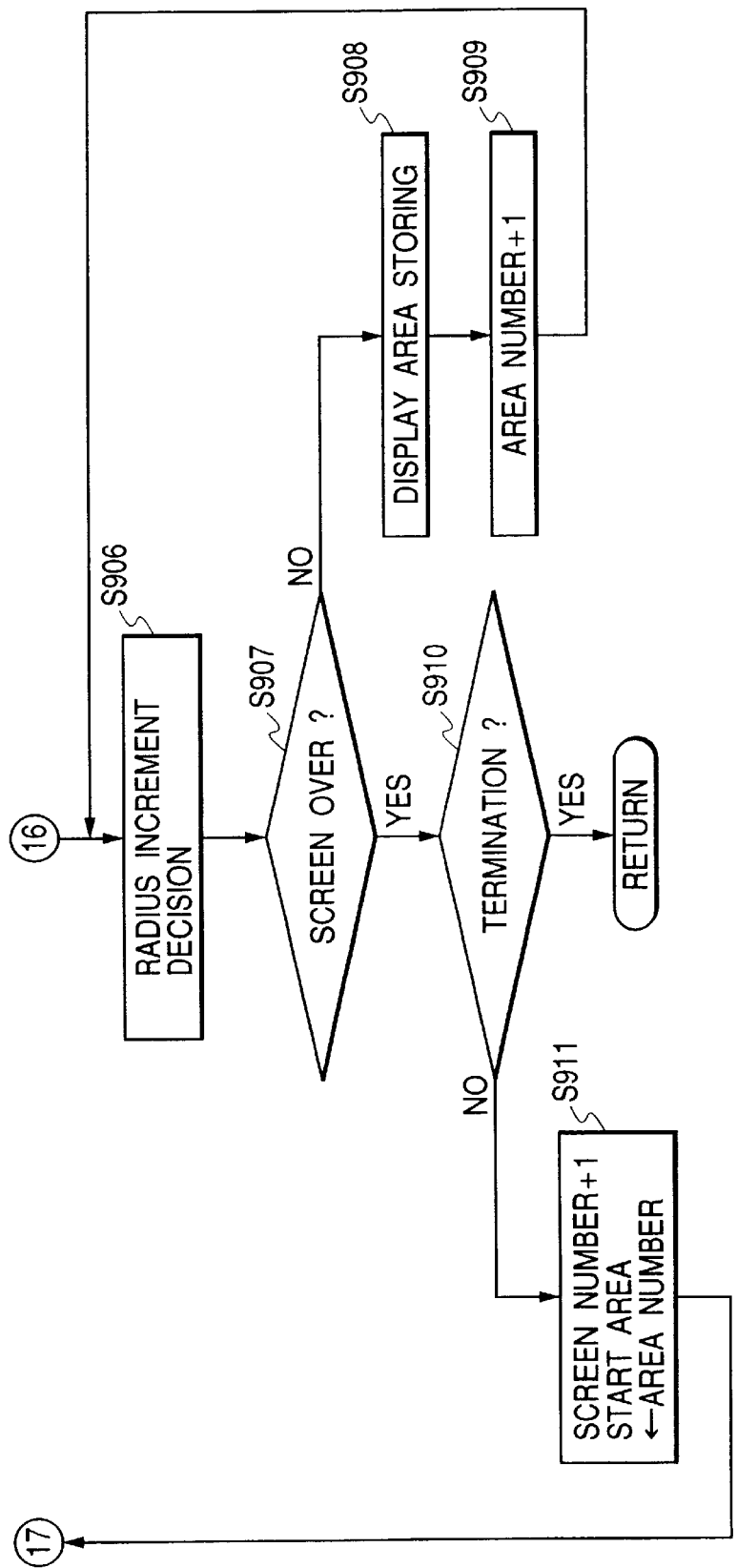
FIG. 34 is a flowchart showing the display scale deciding method in the information searching apparatus according to the embodiment of the invention.

FIGS. 33 and 34 are flowcharts for explaining the process for deciding the display scale in step S703. The details of this process will now be described hereinbelow.

In step S901, the initialization necessary to decide the display scale is performed. That is, "0" is stored into the screen number and "0" is stored into the start area. The screen number denotes the number of the screen for displaying the search result. The start area denotes the number of the area for starting the display of the image on each screen. The "area" indicates a space between the adjacent scales. The number of the area also corresponds to the suffix of the array in the distribution information 611. The screen number and the start area are held in the RAM 203. The value of each element such as display start, scale width, or the like in the screen information 613 is preliminarily initialized to 1. When the process is finished, step S902 follows.

In step S902, "0" is substituted into each of the area number and the scale radius. The area number and the scale radius are held in the RAM 203. The area number corresponds to the suffix in the distribution information 611. The area number for the matching area 706 is set to 0. The number for the area between the similarities 1.0 and 0.9 is set to 1. Similarly, those numbers are allocated in order from the higher similarity. The scale radius denotes a value to express the scale radius which is displayed in the search result display area 703 by the number of dots. When the process is finished, step S903 follows. Step S903 is branched on the basis of a result of the comparison of the area number and the start number. When the value of the area number is smaller than the value of the start number, since no image is displayed in the area corresponding to the area number, step S904 follows. When the value of the area number is equal to or larger than the value of the start number, the processing routine advances to step S906 in order to display the image of the area corresponding to the area number.

In step S904, the radius increment amount of the area shown by the area number is stored into the screen information 613. The radius increment amount is obtained by using the matching area data 605 when the area number is equal to 0 and obtained by using the radius increment data 607 when the area number is other than 0. Since the area number is smaller than the value of the start area here, no image is displayed in this area, namely, the number of images to be displayed is equal to 0. Therefore, it will be understood from FIGS. 11 and 13 that the radius increment amount is equal to 30 dots both in the case where the area number is equal to 0 and in the case where it is not equal to 0.

When no character train exists in the query box 701, the image similar to that of the image ID stored in the comparison base ID has been stored in the similar image buffer 609. When the start area is other than 0, if the image shown by the comparison base ID is not displayed, the image of the comparison base cannot be known. Therefore, only in this case, it is assumed that one image shown by the comparison base ID is displayed in the matching area 706. In this case, therefore, it will be understood that when the area number is equal to 0, the radius increment amount is equal to 60 dots from the matching area data 605 shown in FIG. 11.

When the radius increment amount is decided, the radius increment amount is stored into the scale width corresponding to the screen number and the area number in the screen information 613. For example, when "red apple" is stored in the query box 701 and the value of the screen number is equal to 1, in this process, as shown at (T201) in FIG. 19, "30" is stored as a scale width for the areas corresponding to the similarities in a range from 1.0 to 0.8, respectively. In this process, the decided increment amount is added to the scale radius. When the process is finished, step S905 follows. In step S905, the value of the area number is counted up by "1" in order to process the next area of the area shown by the area number. When the process is finished, step S903 follows.

In step S906, a radius increment amount of the area shown by the area number is decided. The radius increment amount can be obtained from the matching area data 605, radius increment data 607, distribution information 611, and area number. The number of images to be displayed in the area shown by the area number is obtained by using the distribution information 611. The radius increment amount corresponding to the number of images to be displayed in the area is obtained by using the matching area data 605 when the area number is equal to 0 and by using the radius increment data 607 when the area number is other than 0.

For example, in the case where "red apple" has been stored in the query box 701, since the distribution information 611 is as shown at (T101) in FIG. 17, it will be understood that 3, 5, 8, 6, 0, and 5 images are displayed in the respective areas in correspondence to the area numbers of "0, 1, 2, 3, 4, 5", respectively. It will be also understood that the radius increment amounts of the respective areas are equal to "120, 90, 90, 90, 30, 90" by using the matching area data 605 shown in FIG. 11 and by using the radius increment data 607 shown in FIG. 13, respectively.

If no character train exists in the query box 701 and 999 has been stored in the comparison base ID, since the distribution information 611 is as shown at (T102) in FIG. 17, it will be understood that 1, 3, 4, 2, 3, and 0 images are displayed in the respective areas in correspondence to the area numbers of "0, 1, 2, 3, 4, 5", respectively. It will be also understood that the radius increment amounts of the respective areas are equal to "60, 60, 60, 60, 60, 60" by using the matching area data 605 shown in FIG. 11 and by using the radius increment data 607 shown in FIG. 13, respectively. When the process is finished, step S907 follows.

Step S907 is branched in accordance with whether the area shown by the area number can be displayed in the search result display area or not. If the value obtained by adding the radius increment amount obtained in step S906 to the value of the scale radius is larger than the half of the size (600 dots) of the search result display area, the area shown by the area number cannot be displayed in the search result display area, so that step S910 follows. If it is equal to or less than the half of 600 dots, since the area can be displayed, step S908 follows. For example, if the distribution information 611 is as shown at (T101) in FIG. 17, when the screen number is equal to 0 and the area number is equal to 2, the value of the scale radius is equal to 300 and step S908 follows. However, when the screen number is equal to 0 and the area number is equal to 3, since the value of the scale radius is equal to 390, step S910 follows.

In step S908, the increment amount of the radius of the area corresponding to the area number obtained in step S906 is stored in the screen information 613. For example, when the distribution information 611 is as shown at (T101) in FIG. 17, in the screen information 613, "120, 90, 90" are stored as scale widths corresponding to the areas in which the similarities for the screen number "0" lie within a range from 1.0 to 0.8, respectively. "90, 30, 90" are stored as scale widths corresponding to the areas in which the similarities for the screen number "1" lie within a range from 0.7 to 0.5, respectively. When the distribution information 611 is as shown at (T102) in FIG. 17, in the screen information 613, "60, 60, 60, 60, 60, 60" are stored as scale widths corresponding to the areas in which the similarities for the screen number "0" lie within a range from 1.0 to 0.6 as shown at (T202) in FIG. 20, respectively. In this process, the decided radius increment amount is added to the scale radius. When the process is finished, step S909 follows.

In step S909, the value of the area number is counted up by "1" in order to process the next area of the area shown by the area number. When the process is finished, step S906 follows. Step S910 is branched in accordance with whether the process has been performed to all of the images stored in the similar image buffer 609 or not. If all of the values of the elements in the area shown by the area number in the distribution information 611 and subsequent areas are equal to 0, since this means that the process has been performed to all images, the process for deciding the display scale in step S703 is finished. If NO, step S911 follows in order to display the image which is not processed yet onto the next screen. In step S911, first, the value of the start area is substituted into the start area corresponding to the screen number in the screen information 613. The value of the screen number is counted up by "1" in order to process the next screen. The value of the area number is substituted into the start area. When the process is finished, step S902 follows.

Figure 35:
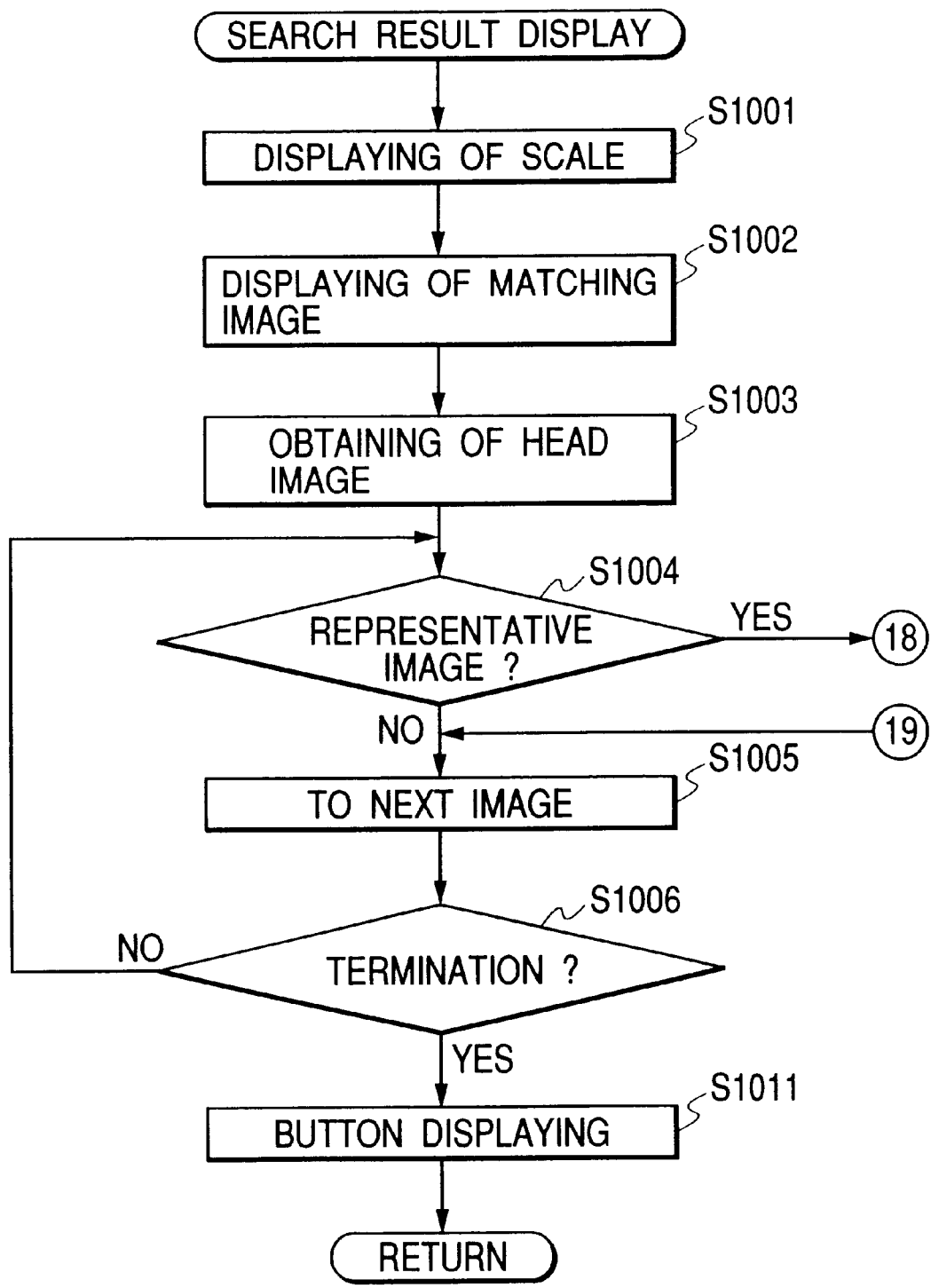
FIG. 35 is a flowchart showing a search result display method in the information searching apparatus according to the embodiment of the invention.
Figure 36:
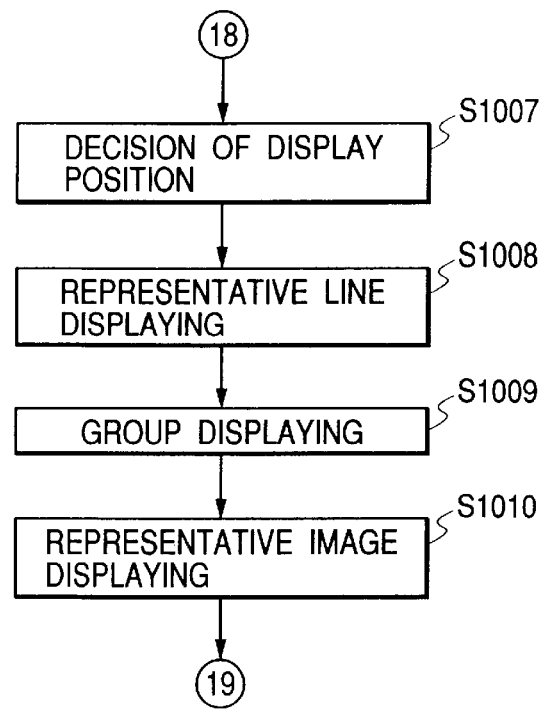
FIG. 36 is a flowchart showing the search result display method in the information searching apparatus according to the embodiment of the invention.

FIGS. 35 and 36 are flowcharts for explaining the process for displaying the search result in steps S310, S405, S503, and S603. According to this process, the screen shown by the screen number is displayed onto the display 208 on the basis of the information of the configuration of the screen stored in the screen information 613 and the information of the image stored in the similar image buffer 609 and image database 604. The details of the process will now be described hereinbelow.

In step S1001, the scale is displayed in the search result display area 703 by using the scale width in the screen information 603 corresponding to the designated screen number. The radius of the scale is added in order from the scale width corresponding to the similarity of 1.0 until the value of the scale width is equal to 1. A circle in which the center of the search result display area 703 is set to the center is displayed for the radius of each scale. For the scale of the similarity of 1.0, its inside region is painted out in gray. When the process is finished, step S1002 follows.

In step S1002, the image of the similarity of 1.0 is displayed in the matching area 706. The image ID corresponding to the item of the similarity of 1.0 is obtained from the head in the similar image buffer 609, the image file corresponding to the image ID is obtained from the image database 604, and the image file is displayed in the matching area 706. As coordinates for displaying the image file, the coordinates corresponding to the number of images to be displayed in the matching area 706 are obtained by using the matching image data 606. If no character train exists in the query box 701, as shown in FIG. 9, a frame of the image shown by the comparison base ID is displayed by double frames. In this case, the image shown by the comparison base ID has certainly been stored as a similarity of 1.0 into the similar image buffer 609. When the process is finished, step S1003 follows.

Step S1003 relates to a process for obtaining the head image ID whose similarity is other than 1.0 as an image ID of the target to be displayed from the similar image buffer 609. When the process is finished, step S1004 follows. Step S1004 is branched in accordance with whether the target image is the representative image or not. If the image ID of the target image has been stored as an image ID in the group information, it is determined that the target image is not the representative image, and step S1005 follows. If the image ID of the target image is not stored as an image ID, it is decided that the target image is the representative image, and step S1007 follows.

In step S1005, the image ID as a display target is changed to the next image ID in the similar image buffer. When the process is finished, step S1006 follows. Step S1006 is branched in accordance with whether the display of the image is finished or not. When the process has been finished to all images in the similar image buffer 609 or in the case where the scale width of the area where the target image is displayed is equal to 1, it is determined that the display of the image is finished, so that step S1011 follows. If NO, it is decided that the display of the image is still continued, and step S1004 follows.

In step S1007, the display position of the image as a display target, namely, the representative image is decided. First, the direction of the coordinates of the center of the image to be displayed is determined from the center of the search result display area 703 by using the allocation angle data 608. When the allocation angle data 608 is used, the direction from the center can be unconditionally determined in accordance with which number of designated representative image is displayed. Subsequently, a distance from the center of the search result display area 703 of the coordinates of the center of the image to be displayed to the coordinates of the center of the image to be displayed is determined by using the screen information 613. The distance from the center of the search result display area 703 to the area for displaying the image can be obtained from the similarity between the designated screen number and the image to be displayed by accumulating the corresponding scale width in the screen information 613 from the area of 1.0. Since the scale width of the area can be obtained from the screen information 613, the distance from the center in the area can be obtained from the similarity with the scale width.

For example, in the case where "1" has been designated as a screen number in a state where the screen information 613 is as shown at (T201) in FIG. 19, if the image having the similarity of 0.56 is displayed, it will be understood that this image is displayed in the area of 0.5. It will be also understood that the distance from the center of the search result display area 703 to 0.5 is equal to (30+30+30+90+30=210 dots) by adding the scale width of 0.6 from the scale width of 1.0. It will be understood that the distance from the center in the area of 0.5 is equal to (90×(0.6−0.56)/0.1=36 dots) because the scale width of the area of 0.5 is equal to 90 dots. In this case, therefore, it will be understood that the distance from the center of the search result display area 703 to the center of the image of the similarity of 0.56 is equal to (210+36=246 dots). As mentioned above, since the angle and distance from the center of the search result display area 703 can be obtained, the position to display the image can be determined. When the process is finished, step S1008 follows.

Step S1008 relates to a process for displaying the representative line to an interval from the center of the search result display area 703 to the display position obtained in step S1007. The representative line, however, is not displayed in the matching area 706. When the process is finished, step S1009 follows. Step S1009 relates to a process for displaying all of the images of the group to which the representative image serving as a target belongs except for the representative image. The images of the group to which the representative image belongs can be obtained by using the group information 612. All of the images corresponding to the image ID in which the value of the representative image ID in the group information 612 is equal to the value of the image ID of the representative image serving as a target to be displayed become the targets of the display.

The distance from the center of the search result display area 703 to each image to be displayed can be obtained from the similarity of each image in the similar image buffer 609 in substantially the same manner as that in step S1007. The distance from the display position of the representative image to the display position of each image can be determined from the group information 612. For example, the distance can be determined by a method whereby the corresponding similarity is obtained from the group information 612 from the representative image ID and the image ID of the image to be displayed and the value obtained by subtracting the similarity from 1.0 is increased by 500 times. The respective images are displayed in order from the image whose similarity with the representative image is lower so as to be alternately displayed on the counterclockwise side and the clockwise side of the representative line while the search result display area 703 is set to the center.

As mentioned above, the distances from two points of the center of the search result display area 703 and the center of the representative image can be obtained and on which line connecting those two points the image is displayed can be determined, the position to display each image can be determined. When the display position of each image is decided, the line connecting the center of each image and the center of the representative image is displayed, and the images are displayed in order from the image whose similarity with the representative image is lower. By displaying the images in such an order, in the case where the images are overlapped, the higher the similarity of the image with the representative image is, the harder the display of such an image is hidden by the other images. When the process is finished, step S1010 follows. In step S1010, the representative image is displayed at the position obtained in step S1007. Since the representative image is displayed lastly in the group, such a situation that the representative image having the highest similarity in the group is hidden by the other images and cannot be seen can be prevented. When the process is finished, step S1005 follows.

In step S1011, the previous screen button 712 and next screen button 713 are displayed. If the designated screen number is equal to 0, since no previous screen exists, the triangle of the previous screen button 712 is displayed in white. If it is not equal to 0, since the previous screen exists, the triangle of the previous screen button 712 is displayed in black. If the value of the start area in the screen information 613 corresponding to the screen number obtained by adding "1" to the designated screen number is equal to 1, since the next screen does not exist, the triangle of the next screen button 713 is displayed in white. If it is not equal to 1, since the next screen exists, the triangle of the next screen button 713 is displayed in black. When the process is finished, the process for displaying the search result is finished.

As described above, according to the information searching apparatus of the embodiment of the invention, since the area to display the information which is completely matched with the searching conditions is distinguished as a complete matching area from the area to display the other information and the information which is completely matched is displayed in the complete matching area, there is such an effect that the information which the user wants to see most as a search result is enabled to be easily seen.

Since the information to be displayed in the complete matching area is displayed so as not to be mutually overlapped, there is such an effect that all of the information of the search result which the user wants to see most can be seen without being hidden by the other information.

Since the information having the higher matching degree is displayed at a position closer to the complete matching area on the outside of the complete matching area, there is such an effect that it is possible to avoid such a situation that the information having high matching degrees is mutually overlapped and becomes hard to be seen.

Since the complete matching area is displayed so as to be distinguished from the other areas, there is such an effect that whether the images are completely matched or not can be seen at a glance.

[Other Embodiments]

The example in which the similar image information 610 is formed every time in step S102 in FIG. 21 has been shown in the embodiment. However, it is also possible to use another method whereby the similar image information is previously formed by performing a process similar to that in step S102 and stored as associated data into the CD-ROM 205 and loaded into the RAM 203 in step S101.

Although the example in which the image database 502 is stored into the CD-ROM 205 has been shown in the embodiment, the image database stored in the HD of the HD drive 206 can be also handled.

Although the example in which the information search program and associated data are directly loaded from the CD-ROM 205 into the RAM 203 as an external storing apparatus and executed has been shown in the embodiment, it is also possible to use another method whereby the information search program and associated data are temporarily installed from the CD-ROM 205 into the HD of the HD drive 206 and, at a point when the information search program is made operative, they are loaded from the HD of the HD drive 206 into the RAM 203. The medium for storing the information search program is not limited to the CD-ROM but an FD (floppy disk), an IC memory card, or the like can be also used. Further, it is possible to use another method whereby the information search program is stored into the ROM 202 and constructed so as to become a part of a memory map and is directly executed by the CPU 201.

The example of using English as a language which is used as a query and an explanation has been shown in the embodiment, the invention is not limited to English but can be also applied to every language including Japanese.

In the embodiment, in order to obtain the image similar to the designated image in step S111 in FIG. 22, the similarity is calculated by using the explanation annexed to the image. The invention, however, does not depend on the calculating method of the similarity. For example, the similarity can be also calculated by using the information of the image itself such as luminance, color, composition, or the like of the image.

Although the example of searching the image as a target of the information search has been shown in the embodiment, the search target which is handled by the invention is not limited to the image. For example, the invention is effective to various information search targets such as document, video image, audio sound, and the like. Although the example of displaying the image itself in case of searching the image as a search result which is displayed in the search result display area has been shown, in case of searching a document, a title, a keyword, or the like of the document can be also displayed in place of the image. In case of a video image, information such as title, representative scene, or the like representing the video image can be also displayed or a video image of each result can be also reproduced.

Figure 37:
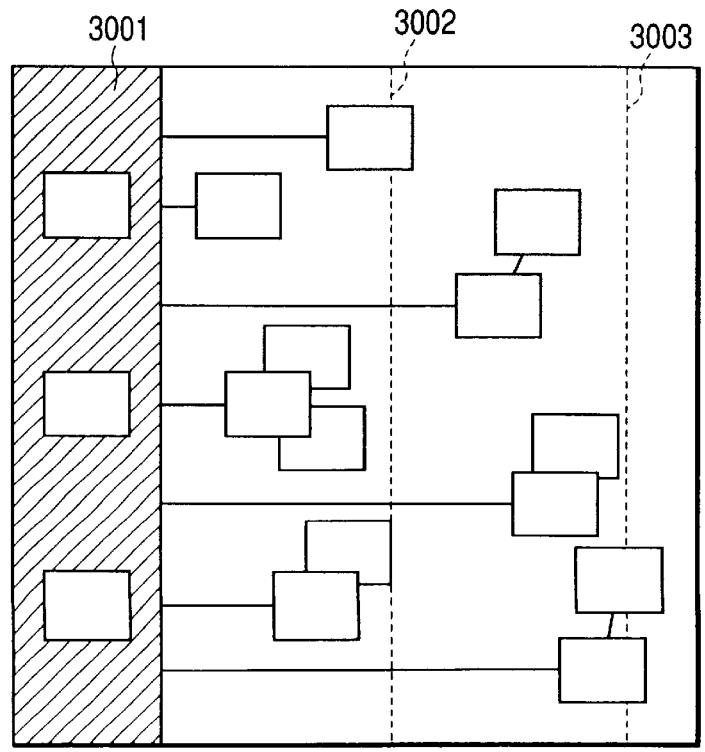
FIG. 37 is an explanatory diagram showing a search result display area for explaining another method of displaying search results in the information searching apparatus according to another embodiment of the invention.

In the embodiment, as shown in FIG. 7, the matching area is displayed as an area of the circle in which the center of the search result display area is set to the center, each scale is displayed by a concentric circle with the matching area, and the images as search results are displayed so as to be radially arranged from the center of the search result display area while allowing the similarity to correspond to the distance from the matching area. However, the invention is not limited to the display method as mentioned above. For example, as shown in FIG. 37, it is also possible to use a method whereby the matching area is set to a rectangular area on the left side of a search result display area shown at 3001, each scale is set to a parallel line that is parallel with the left side like a line as shown at 3002 or 3003, and a distance of a straight line of a perpendicular from each image to the matching area is displayed in correspondence to the similarity of each image. In this case, in place of designating the allocating position of each image by the angle for the center of the matching area as shown in the allocation angle data 608, by designating the allocating position by the distance from the top side of the search result display area, the image of the search result can be displayed at a desired position by substantially the same procedure as that shown in the embodiment. Even in case of displaying the search result as mentioned above, as shown in FIG. 37, the images of the search results can be grouped and displayed in a manner similar to the embodiment.

The invention can be applied to a system constructed by a plurality of apparatuses or can be also applied to an apparatus constructed by one equipment. The invention can be also accomplished by a method whereby a storage medium in which program codes of software to realize the functions of the embodiments mentioned above have been stored is supplied to a system or an apparatus and a computer (or a CPU or an MPU) of the system or apparatus reads out and executes the program codes stored in the storage medium.

In this case, the program codes themselves read out from the storage medium realize the functions of the embodiments mentioned above and the storage medium in which the program codes have been stored construct the invention.

As a storage medium for supplying the program codes, for example, a floppy disk, a hard disk, an optical disk, a magnetooptic disk, a CD-ROM, a CD-R, a magnetic tape, a non-volatile memory card, an ROM, or the like can be used.

The invention incorporates not only the case where the functions of the embodiments mentioned above are realized by executing the read-out program codes by the computer but also the case where the OS or the like which is operating on the computer executes a part or all of the actual processes on the basis of the instructions of the program codes and the functions of the embodiments mentioned above are realized by those processes.

Further, the invention incorporates the case where the program codes read out from the storage medium are written into a memory equipped for a function expanding board inserted to a computer or a function expanding unit connected to a computer and, after that, a CPU or the like equipped for the function expanding board or the function expanding unit executes a part or all of the actual processes on the basis of instructions of the program codes, and the functions of the embodiments mentioned above are realized by those processes.

As described above, the display area of the information whose matching degree indicates the complete matching is determined and the information is displayed on the inside or outside of the complete matching area in accordance with whether the matching degree indicates the complete matching or not, namely, the area to display the information which is completely matched with the searching conditions is distinguished as a complete matching area from the area for displaying the other information, and the completely matching information is displayed in the complete matching area, so that there is such an effect that the information which the user wants to see most as a search result is enabled to be easily seen.

Since the information having the higher matching degree is displayed at a position closer to the complete matching area on the outside of the complete matching area, there is such an effect that it is possible to avoid such a situation that the information having high matching degrees is mutually overlapped and becomes hard to be seen.

Since the information to be displayed in the complete matching area is displayed so as not to be mutually overlapped, there is such an effect that the whole information of the search result which the user wants to see most is enabled to be seen without being hidden by the other information.

Since the complete matching area is displayed so as to be distinguished from the other areas, there is such an effect that whether the images are completely matched or not can be seen at a glance.

There is also such an effect that the information which the user wants to see most as a search result, namely, the information such as image, document, video image, or the like is enabled to be easily seen. There is such an effect that the whole information of the search result which the user wants to see is enabled to be easily seen without being hidden by the other information. There is such an effect that it is possible to avoid such a situation that the information having high matching degrees is mutually overlapped and becomes hard to be seen. There is such an effect that whether the images are completely matched or not can be seen at a glance.

As described in detail above, according to the information searching method and apparatus of the invention, the similarity of each information of the search result is obtained, the information of the search results is grouped on the basis of the similarities, and the grouped information is displayed at the mutually close positions. Therefore, whether the group corresponds to desired information or not can be discriminated without checking all of the information of the group. There is, consequently, such an effect that there is no need to check all of the information and the efficiency of evaluating the search result can be improved.

As described in detail above, according to the invention, the position to display the information of the search result is determined by the distance from the origin corresponding to the matching and decided by another element corresponding to the order of the high/low matching degrees. Particularly, the angle which is defined by the display position of the information for the reference direction from the origin is determined in correspondence to the order of the high/low matching degrees.

Thus, the search results can be traced and seen in order from the high matching degree. Such a situation that a plurality of information having close matching degrees is mutually overlapped and displayed can be avoided.

As described in detail above, according to the invention, the matching degree serving as a degree at which each information as a search target satisfies the searching conditions is calculated and the display position in case of displaying each information which satisfies the searching conditions onto the screen display portion is decided on the basis of the matching degree of each of the information and displayed on the screen display portion. Further, an index for visually and easily indicating the matching degree is displayed on the screen display portion.

Thus, which distribution the information derived as a search result has for each matching degree can be easily grasped at a glance. Whether the search result which satisfies the inputted searching conditions could be obtained or not can be easily grasped.

What is claimed is:

1. An information searching apparatus for searching for information, comprising:

obtaining means for obtaining a matching degree between inputted search conditions and each retrievable item of information calculated by calculating means; and display control means for displaying items of pieces of information, each of which has a complete matching degree in a complete matching area, and displaying items of pieces of information, each of which has an uncompleted degree in an uncompleted matching area, wherein said display control means controls to display the items of pieces of information in the complete matching area without overlapping each other, and allows the items of pieces of information in the uncompleted matching area to overlap each other.

2. An apparatus according to claim 1, further comprising:
search condition input means for inputting the search conditions; and
information memory means for storing each item of information serving as a search target, wherein
the calculating means compares each item of information stored in said information memory means with the search conditions inputted by said search condition input means and calculates the matching degree, and
said display control means displays an item of information whose matching degree indicates a complete matching in the complete matching area and decides a display position outside the complete matching area based on the matching degree with respect to an item of information whose matching degree does not indicate a complete matching.

3. An apparatus according to claim 1, wherein said display control means decides a size of the complete matching area based on a number of items of information for which the matching degree indicates a complete matching.

4. An apparatus according to claim 3, wherein
said display control means decides a size of the complete matching area such that each item of information whose matching degree indicates a complete matching is not mutually overlapped, and
said display control means decides a display position such that each item of information whose matching degree indicates a complete matching is not mutually overlapped in the complete matching area.

5. An apparatus according to claim 4, wherein
said display control means decides the size of the complete matching area such that the complete matching area is a circle, and
said display control means radially displays each item of information that satisfies the search conditions with the complete matching area being set to a center.

6. An apparatus according to claim 4, wherein
said display control means decides the size of the complete matching area such that the complete matching area is a rectangle, and
said display control means displays each item of information that satisfies the search conditions with the complete matching area being set to a reference area.

7. An apparatus according to claim 1, wherein said apparatus is used to search for information that includes at least one of an image, a document, a video image, and an audio sound.

8. An apparatus according to claim 7, wherein said apparatus is incorporated in a computer of an information processing apparatus.

9. An apparatus according to claim 1, wherein
said display control means displays on a screen an index for enabling a spatial change of the matching degree to be visually and easily seen.

10. An apparatus according to claim 9, wherein said display control means displays a scale as the index of the matching degree.

11. An apparatus according to claim 9, wherein, as an index of the matching degree, said display control means displays a scale of a concentric circle in which the predetermined position is set to a center.

12. An apparatus according to claim 9, wherein said display control means sets the predetermined position to one side of a polygon and displays each item of information that satisfies the search conditions inside the polygon.

13. An information searching apparatus according to claim 1, further comprising:
similarity calculating means for mutually comparing each item of information of the search results and obtaining a similarity of each item of information;
grouping means for grouping items of information of the search results by using the similarities obtained by said similarity calculating means; and
search result display means for deciding a display position of each item of information and displaying each item of information such that items of information of the search results belonging to a group are displayed close to each other.

14. An apparatus according to claim 13,
wherein information having a highest matching degree in a group is set as representative information, and
wherein said search result display means displays information having a matching degree indicative of a complete matching in a complete matching display position, allows a distance on a display area from the complete matching display position and the matching degree of the representative information to correspond to each other, decides a display position of the representative information, and thereafter, decides a display position of each item of information belonging to the group.

15. An apparatus according to claim 14, wherein said search result display means decides a display position of information other than the representative information from the matching degree of each item of information and a similarity with the representative information.

16. An apparatus according to claim 13, wherein for each item of information,
said grouping means sets information whose similarity is equal to or higher than a specified similarity value for the information and is highest and whose matching degree is higher than a specified matching value for the information to group upper information,
forms a binary relation,
sets a tree formed by combining binary relations to one group, and
sets a route of the tree to the representative information.

17. An apparatus according to claim 1, further comprising:
distance deciding means for deciding a distance from the complete matching area to each of the items of pieces of information in the uncompleted area based on the result of the matching degree;
order forming means for arranging distances decided by said distance deciding means for each item of information that satisfies a part of the search conditions in order from a large value and forming an order; and
wherein said display control means decides a position to display the items of information in the uncompleted area and displays the items of information in correspondence to the order formed by said order forming means.

18. An apparatus according to claim 17, wherein said display control means radially displays each item of information that satisfies a part of the search conditions while setting the complete matching display position to a center, and decides an angle of a display position of each item of information for a reference direction from the center of the complete matching display position based on the order formed by said order forming means.

19. An information searching method, which is applied to an information searching apparatus for searching for information, comprising:

an obtaining step, of obtaining a matching degree between inputted search conditions and each retrievable item of information calculated in a calculating step; and a display control step, of controlling to display items of pieces of information, each of which has a complete matching degree in a complete matching area without overlapping each other, and to display items of pieces of information, each of which has an uncompleted degree in an uncompleted matching area and which is allowed to overlap each other.

20. A method according to claim 19, wherein, in said display control step, a size of the complete matching area is decided based on a number of items of information for which the matching degree indicates a complete matching.

21. A method according to claim 20, wherein, in said display control step, a size of the complete matching area is decided such that each item of information whose matching degree indicates a complete matching is not mutually overlapped, and in said display control step, a display position is decided such that each item of information whose matching degree indicates a complete matching is not mutually overlapped in the complete matching area.

22. A method according to claim 21, wherein, in said display control step, the size of the complete matching area is decided such that the complete matching area is a circle, and in said display control step, each item of information that satisfies the search conditions is radially displayed with the complete matching area being set to a center.

23. A method according to claim 21, wherein, in said display control step, the size of the complete matching area is decided such that the complete matching area is a rectangle, and in said display control step, each item of information that satisfies the search conditions is displayed with the complete matching area being set to a reference area.

24. A method according to claim 19, wherein said method is used to search for information that includes at least one of an image, a document, a video image, and an audio sound.

25. A method according to claim 24, wherein said method is performed by a computer of an information processing apparatus.

26. A method according to claim 19, further comprising:

a similarity calculating step, of mutually comparing each item of information of the search results and obtaining a similarity of each item of information;

a grouping step, of grouping respective items of information of the search results by using the similarities obtained in said similarity calculating step; and a search result display step, of deciding a display position of each item of information and displaying each item of information such that items of information of the search results belonging to a group are displayed close to each other.

27. A method according to claim 26, wherein information having a highest matching degree in a group is set as representative information and, in said search result display step, information having a matching degree indicative of a complete matching is displayed in a complete matching display position, a distance on a display area from the complete matching display position and the matching degree of the representative information are made to correspond, a display position of the representative information is decided, and thereafter, a display position of each item of information belonging to the group is decided.

28. A method according to claim 27, wherein, in said search result display step, a display position of information other than the representative information is decided from the matching degree of each item of information and a similarity with the representative information.

29. A method according to claim 26, wherein, in said grouping step, for each item of information, information whose similarity is equal to or higher than a specified similarity value for the information and is highest and whose matching degree is higher than a specified matching value for the information is set to group upper information, a binary relation is formed, a tree formed by combining binary relations is set to one group, and a route of the tree is set to the representative information.

30. A method according to claim 19, further comprising:

a distance deciding step, of deciding a distance from the complete matching area to each of the items of pieces of information in the uncompleted area based on the result of the matching degree;

an order forming step, of arranging distances decided in said distance deciding step for each item of information that satisfies a part of the search conditions in order from a large value and forming an order; and wherein, in said display control step, a position to display the items of information in the uncompleted area is decided and the items of information in correspondence to the order formed in said order forming step.

31. A method according to claim 19, wherein an index is displayed on a screen for enabling a spatial change of the matching degree to be visually and easily seen in said display control step.

32. A method according to claim 31, wherein in said matching degree index display step, a scale is displayed as the index of the matching degree.

33. A method according to claim 31, wherein, in said display control step, a scale of a concentric circle in which the predetermined position is set to a center is displayed as an index of the matching degree.

34. A method according to claim 31, wherein, in said display control step, the predetermined position is set to one side of a polygon and each item of information that satisfies the search conditions is displayed inside the polygon.

35. A computer-readable storage medium, which stores a program for executing an information searching method used by an information searching apparatus to search for information, wherein said information searching method comprises:

an obtaining step, of obtaining a matching degree between inputted search conditions and each retrievable item of information calculated in a calculating step; and a display control step of controlling to display items of pieces of information, each of which has a complete matching degree in a complete matching area without overlapping each other, and to display items of pieces of information, each of which has an uncompleted degree in an uncompleted matching area an which is allowed to overlap each other.

36. A medium according to claim 35, wherein, in said display control step, a size of the complete matching area is decided based on a number of items of information for which the matching degree indicates a complete matching.

37. A medium according to claim 36, wherein, in said display control step, a size of the complete matching area is decided such that each item of information whose matching degree indicates a complete matching is not mutually overlapped, and in said display control step, a display position is decided such that each item of information whose matching degree indicates a complete matching is not mutually overlapped in the complete matching area.

38. A medium according to claim 37, wherein, in said display control step, the size of the complete matching area is decided such that the complete matching area is a circle, and in said display control step, each item of information that satisfies the search conditions is radially displayed with the complete matching area being set to a center.

39. A medium according to claim 37, wherein, in said display control step, the size of the complete matching area is decided such that the complete matching area is a rectangle, and in said display control step, each item of information that satisfies the search conditions is displayed with the complete matching area being set to a reference area.

40. A medium according to claim 35, wherein said method is used to search for information that includes at least one of an image, a document, a video image, and an audio sound.

41. A medium according to claim 40, wherein said method is performed in a computer of an information processing apparatus.

42. A medium according to claim 35, further comprising:

a similarity calculating step, of mutually comparing each item of information of the search results and obtaining a similarity of each item of information;

a grouping step, of grouping items of information of the search results by using the similarities obtained in said similarity calculating step; and a search result display step, of deciding a display position of each item of information and displaying each item of information such that items of information of the search results belonging to a group are displayed closely to each other.

43. A medium according to claim 42, wherein, in the method:

information having a highest matching degree in a group is set as representative information; and in said search result display step, information having a matching degree indicative of a complete matching is displayed in a complete matching display position, a distance on a display area from the complete matching display position and the matching degree of the representative information are made to correspond a display position of the representative information is decided, and thereafter, a display position of each item of information belonging to the group is decided.

44. A medium according to claim 43, wherein, in said search result display step, a display position of information other than the representative information is decided from the matching degree of each item of information and a similarity with the representative information.

45. A medium according to claim 42, wherein, in said grouping step:

for each information, information whose similarity is equal to or higher than a specified similarity value for the information and is highest and whose matching degree is higher than a specified matching value for the information is set to group upper information, a binary relation is formed, a tree formed by combining binary relations is set to one group, and a route of the tree is set to the representative information.

46. A medium according to claim 35, wherein said information searching method further comprises:

a distance deciding step, of deciding a distance from the complete matching area to each of the items of pieces of information in the uncompleted area based on the result of the matching degree;

an order forming step, of arranging distances decided in said distance deciding step for each item of information that satisfies a part of the search conditions in order from a large value and forming an order; and wherein, in said display control step, a position to display the items of information in the uncompleted area is decided and the items of information in correspondence to the order formed in said order forming step.

47. A medium according to claim 46, wherein, in said display control step, each item of information that satisfies a part of the search conditions is radially displayed while the complete matching display position is set to a center, and an angle of a display position of each item of information for a reference direction from the center of the complete matching display position is decided based on the order formed in said order forming step.

48. A medium according to claim 35, wherein an index is displayed on a screen for enabling a spatial change of the matching degree to be visually and easily seen in said display control step.

49. A medium according to claim 48, wherein in said display control step, a scale is displayed as the index of the matching degree.

50. A medium according to claim 48, wherein, in said display control step, a scale of a concentric circle in which the predetermined position is set to a center is displayed as an index of the matching degree.

51. A medium according to claim 48, wherein, in said display control step, the predetermined position is set to one side of a polygon and each item of information that satisfies the search conditions is displayed inside the polygon.

* * * * *

UNITED STATES PATENT AND TRADEMARK OFFICE
CERTIFICATE OF CORRECTION

PATENT NO. : 6,853,389 B1
DATED : February 8, 2005
INVENTOR(S) : Kazuyo Ikeda

It is certified that error appears in the above-identified patent and that said Letters Patent is hereby corrected as shown below:

<u>Drawings,</u>
SHEET 17, Figure 25, "SUMILARITY" should read -- SIMILARITY --.

<u>Column 1,</u>
Line 30, "those" should read -- that --.

<u>Column 3,</u>
Line 5, "loaded-into" should read -- loaded into --.

<u>Column 9,</u>
Line 12, "coordinates" should read -- coordinate --;
Line 19, "coordinates," should read -- coordinate, --; and
Line 24, "images," should read -- images --.

<u>Column 10,</u>
Line 40, "(IDO)" should read -- (ID0) --; and
Line 63, "The, group" should read -- The group --.

<u>Column 12,</u>
Line 61, "displayof" should read -- display of --.

<u>Column 16,</u>
Line 13, "S111" should read -- S111 --.

<u>Column 25,</u>
Line 24, "an" should read -- a --.

UNITED STATES PATENT AND TRADEMARK OFFICE
CERTIFICATE OF CORRECTION

PATENT NO. : 6,853,389 B1
DATED : February 8, 2005
INVENTOR(S) : Kazuyo Ikeda

It is certified that error appears in the above-identified patent and that said Letters Patent is hereby corrected as shown below:

Column 30,
Line 66, "area an" should read -- area and --.

Signed and Sealed this

Fifth Day of July, 2005

JON W. DUDAS
*Director of the United States Patent and Trademark Office*